United States Patent
Zawodny et al.

(10) Patent No.: US 6,353,714 B1
(45) Date of Patent: Mar. 5, 2002

(54) CAMERA WITH MEANS FOR SUPERIMPOSING IMAGES ON EXPOSURES

(76) Inventors: Arthur Zawodny, Block 7, Flat 14G, Tsing Yi Garden, Tsing Yi Island (HK); Franco Yik Kai Chung, 15/H, Block 6, Lynwood Court, Kingswood Villas, TSW YL (HK)

( * ) Notice: Subject to any disclaimer, the term of this patent is extended or adjusted under 35 U.S.C. 154(b) by 0 days.

(21) Appl. No.: 09/428,851

(22) Filed: Oct. 28, 1999

(51) Int. Cl.$^7$ ............................................. G03B 17/24
(52) U.S. Cl. ....................... 396/317; 396/335; 396/340
(58) Field of Search ................................ 396/316, 317, 396/335, 340

(56) References Cited

U.S. PATENT DOCUMENTS

| | | | |
|---|---|---|---|
| 2,125,388 A | * 8/1938 | Monroe | 396/335 |
| 3,665,828 A | 5/1972 | Reiter | 95/11 R |
| 3,733,485 A | 5/1973 | Gaynor et al. | 250/65 T |
| 3,733,985 A | * 5/1973 | Gordon | 396/316 |
| 4,011,570 A | 3/1977 | Stiévenart et al. | 354/89 |
| 4,206,997 A | 6/1980 | Licciardi | 355/39 |
| 4,268,144 A | 5/1981 | Wheeler | 354/108 |
| 4,291,962 A | 9/1981 | Jackson | 354/122 |
| 4,310,232 A | 1/1982 | Reed | 354/125 |
| 4,427,279 A | 1/1984 | Edelstein et al. | 354/107 |
| 4,533,224 A | 8/1985 | Ou | 354/77 |
| 4,655,570 A | 4/1987 | Jaffe | 354/107 |
| 4,717,930 A | 1/1988 | Wheeler | 354/108 |
| 4,816,848 A | 3/1989 | Doyle, Jr. | 354/108 |
| 4,894,671 A | 1/1990 | Wheeler | 354/108 |
| 4,896,176 A | 1/1990 | Barrett | 354/122 |
| 4,994,832 A | 2/1991 | Spector | 354/110 |
| 5,111,224 A | 5/1992 | Spector | 354/125 |
| 5,119,118 A | 6/1992 | Harada et al. | 354/106 |
| 5,247,320 A | 9/1993 | Kay | 354/83 |
| 5,249,008 A | 9/1993 | Mauchan | 354/108 |
| 5,262,808 A | 11/1993 | Mauchan | 354/108 |
| 5,276,470 A | 1/1994 | Fridman | 354/106 |
| 5,331,363 A | 7/1994 | Fridman | 354/159 |
| 5,339,125 A | 8/1994 | Fridman et al. | 354/106 |
| 5,361,108 A | * 11/1994 | Kamata et al. | 396/335 |
| 5,400,097 A | * 3/1995 | Okoyama | 396/335 |
| 5,486,885 A | 1/1996 | Matsumoto | 354/106 |
| 5,521,665 A | 5/1996 | Petruchik | 354/149.1 |
| 5,555,053 A | 9/1996 | Stephenson, III | 354/206 |

* cited by examiner

*Primary Examiner*—David M. Gray
(74) *Attorney, Agent, or Firm*—Woodcock Washburn LLP

(57) ABSTRACT

The camera of this invention can create a composite image on a frame of film that includes an image of an object whose picture is being taken by the camera and an image stored on a mask disposed within the camera. The mask is preferably disposed on a mask cartridge that can be inserted and removed from the camera. Disposed on the mask is a plurality of mask objects whose images can be created on a frame of film. The camera preferably includes a first and a second film exposing chamber. A first section of the mask is preferably disposed in the first film exposing chamber. In this first film exposing chamber, a first portion of a frame of film is preferably exposed and an object image of the object whose picture is being taken with the camera is created on the first portion of the frame of film. In the second film exposing chamber, a second portion of the frame of film that was not exposed in the first film exposing chamber is preferably exposed to a mask object stored on the mask to create a mask image on the second portion of the frame of film. Thus, by exposing a different portion of a frame of film in a different chamber within the camera, a composite image can be created on a frame of film. In a preferred embodiment of this invention, the first portion of a frame of film is exposed at a different time then the second portion of the frame of film. In another preferred embodiment of this invention the first and the second portion of a frame of film are exposed simultaneously to form a composite image.

61 Claims, 14 Drawing Sheets

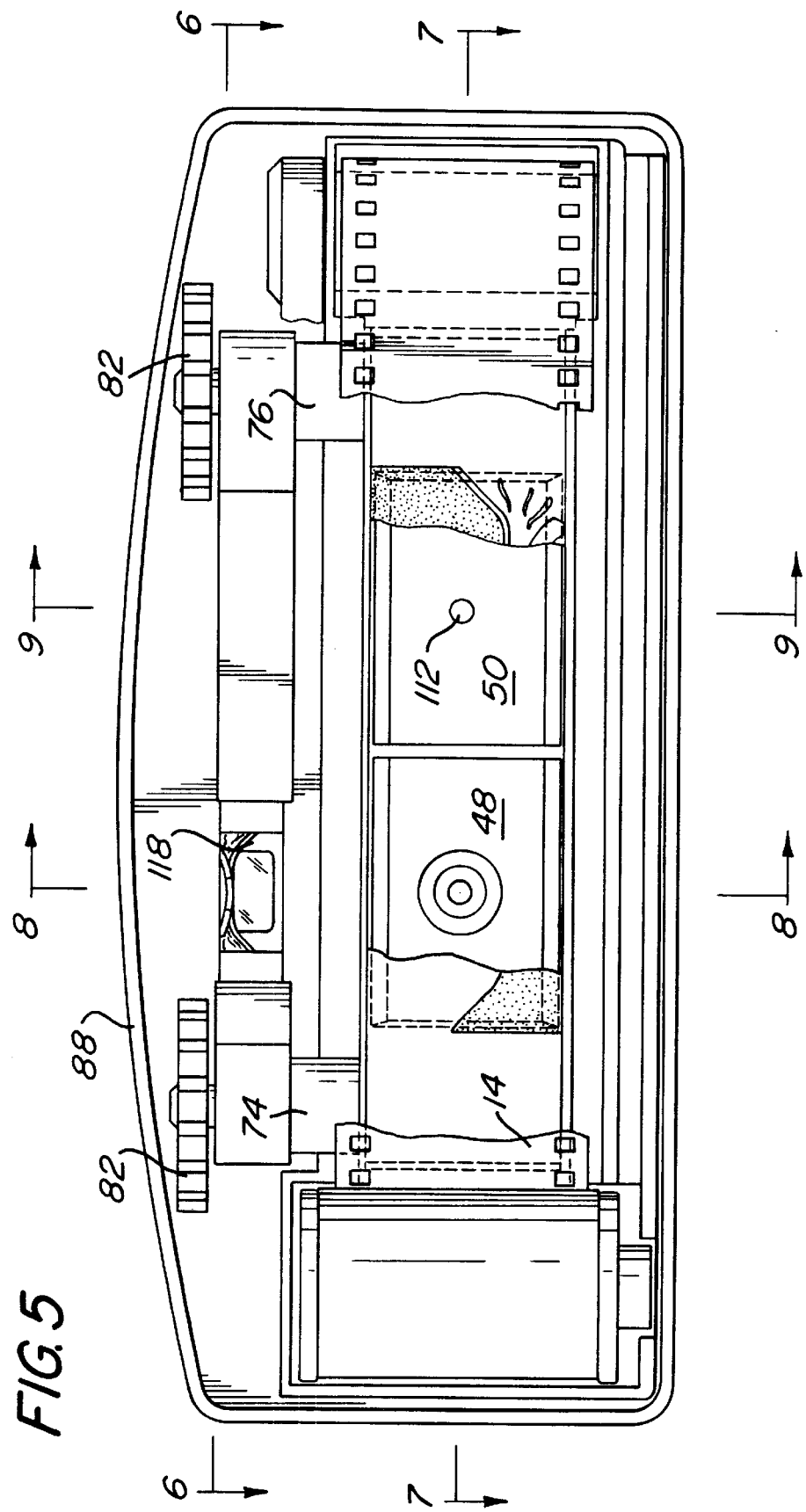

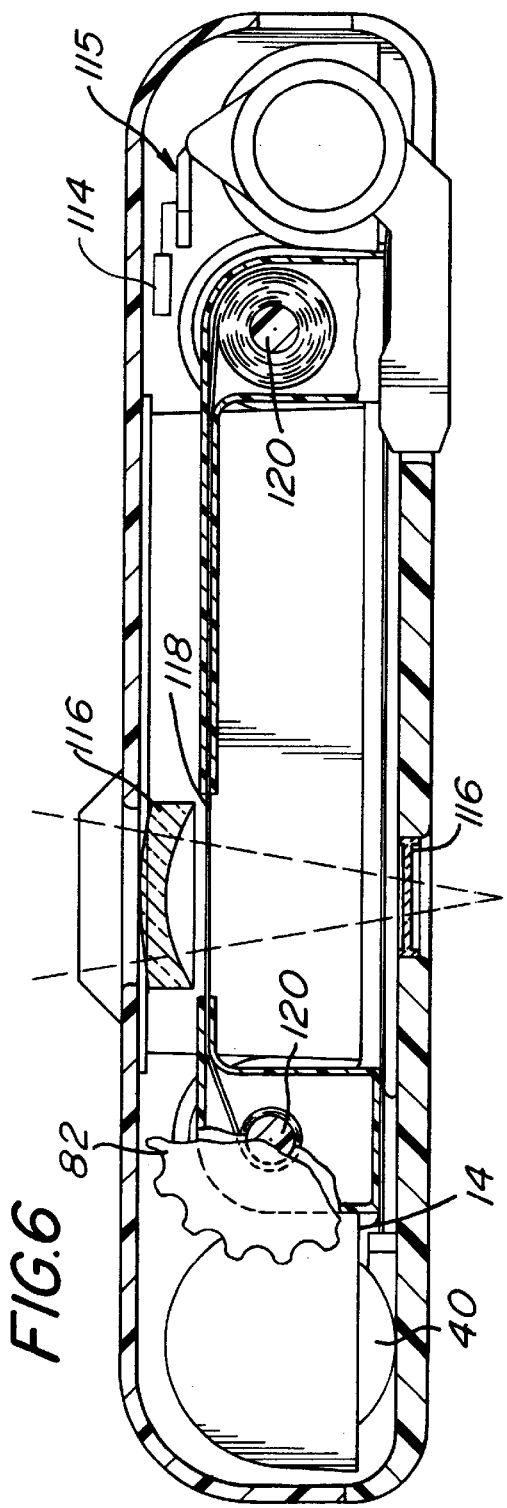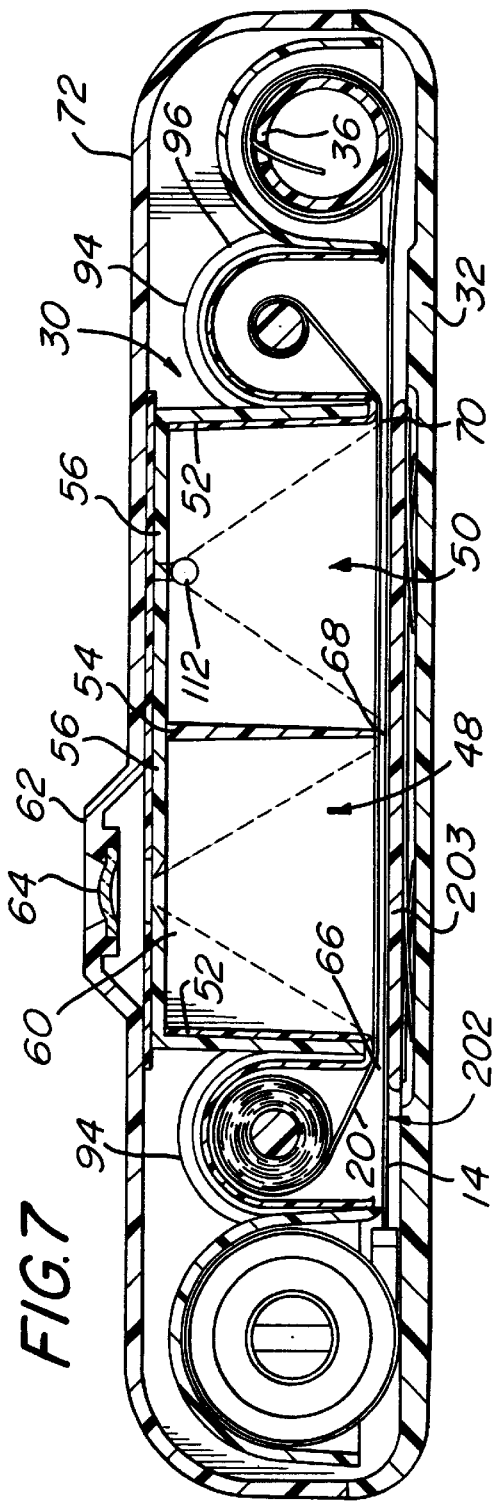

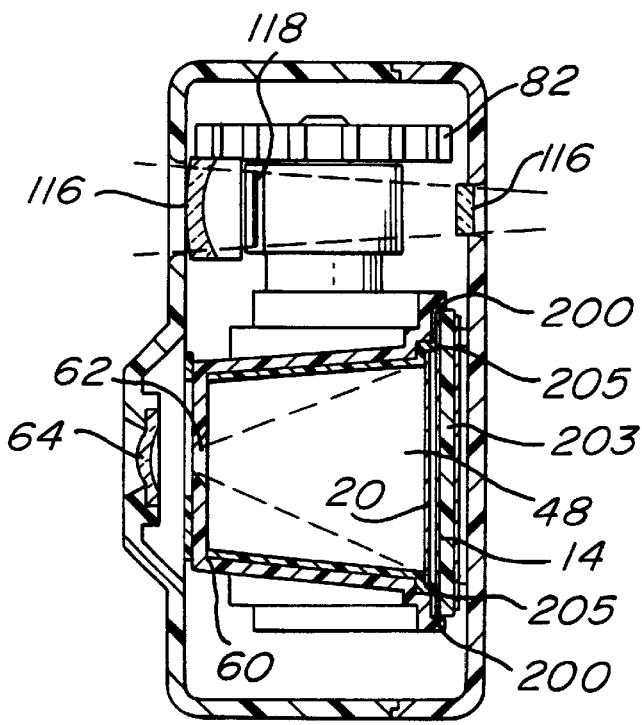
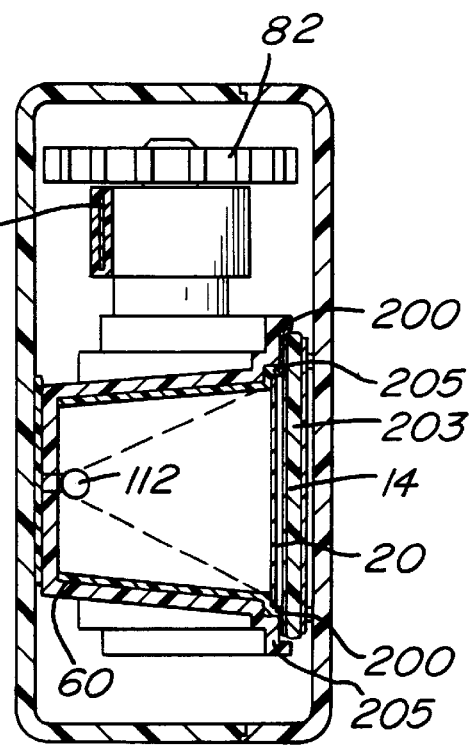

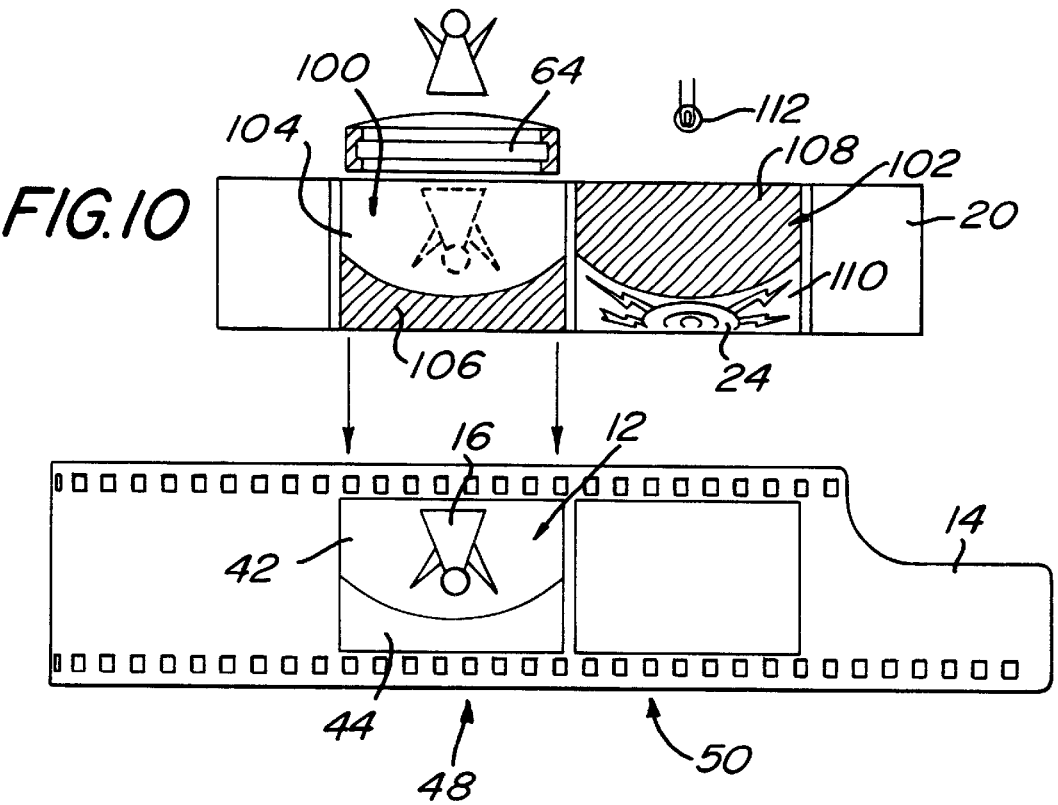
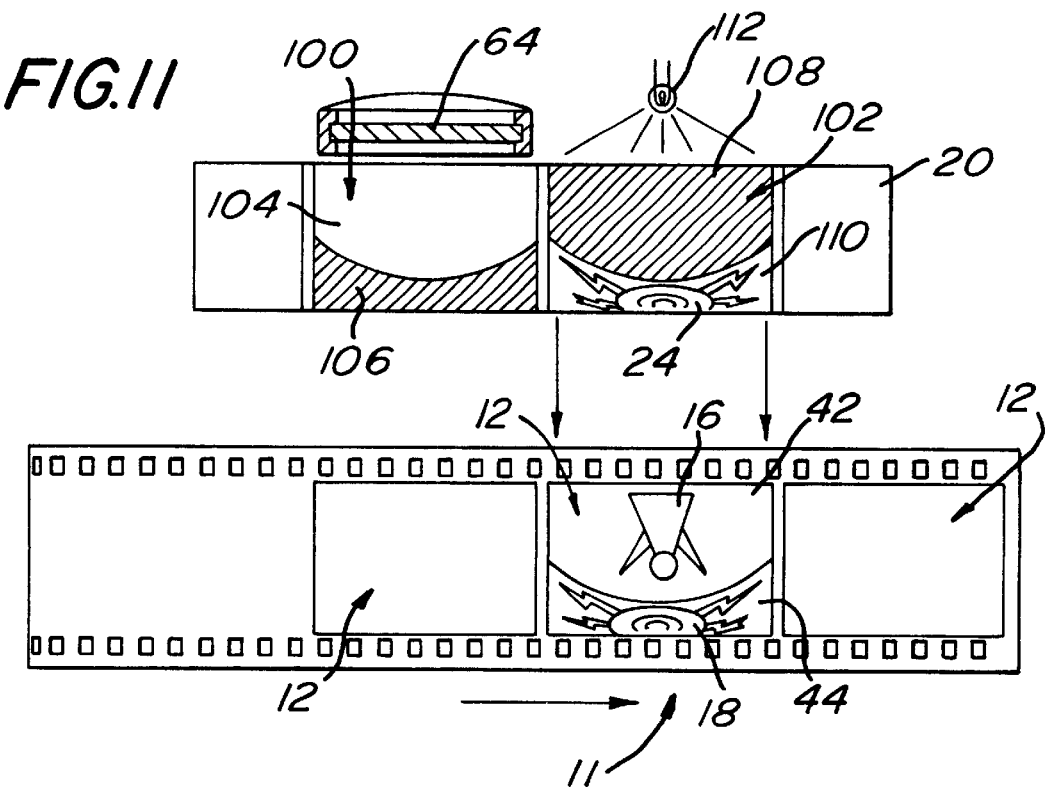

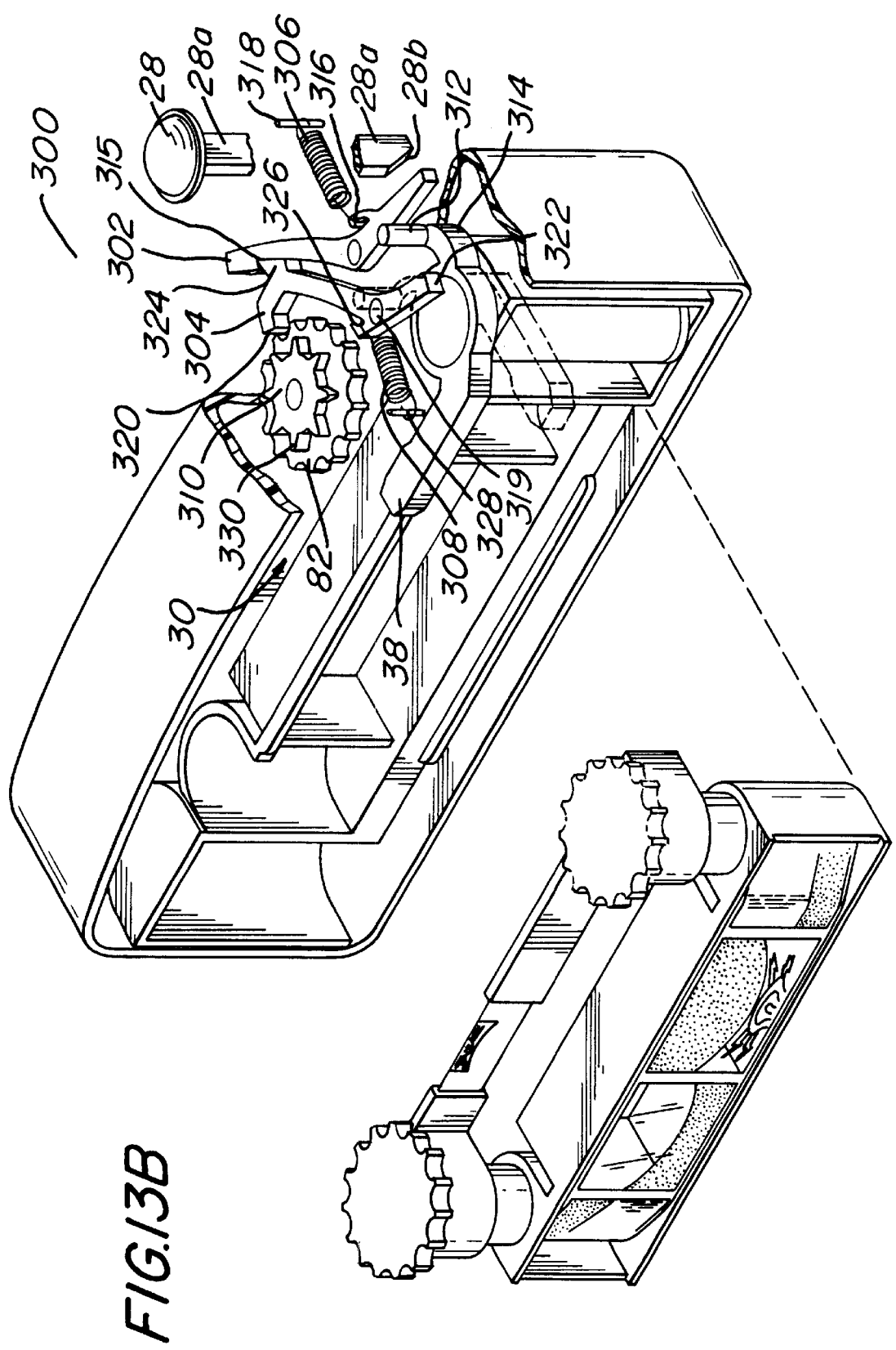

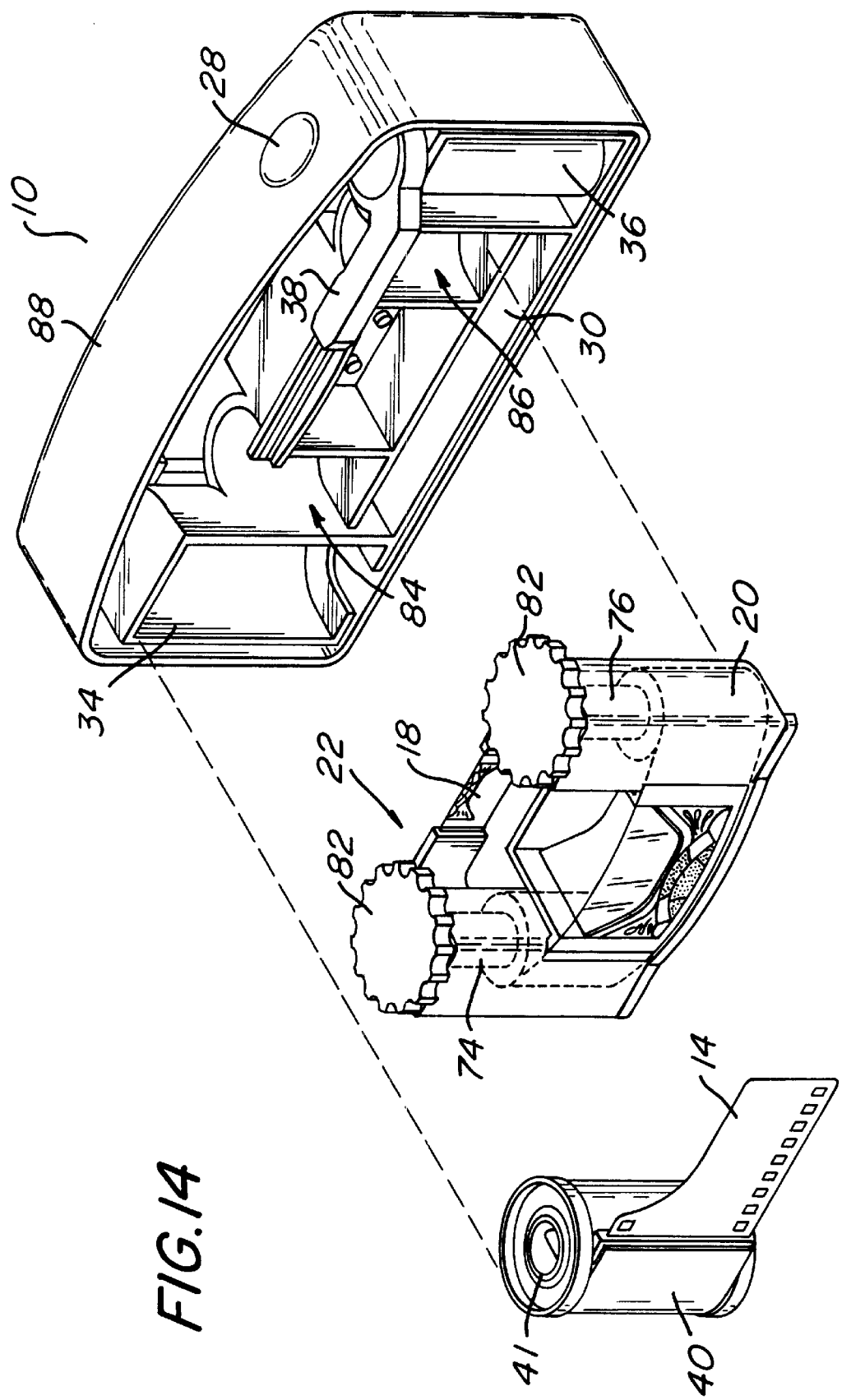

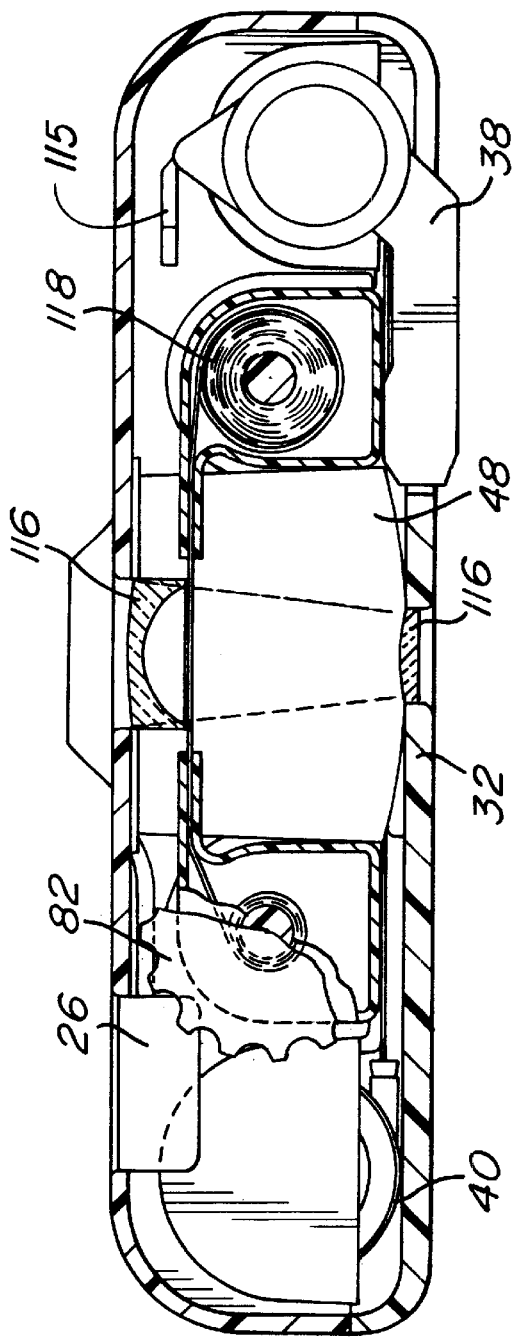
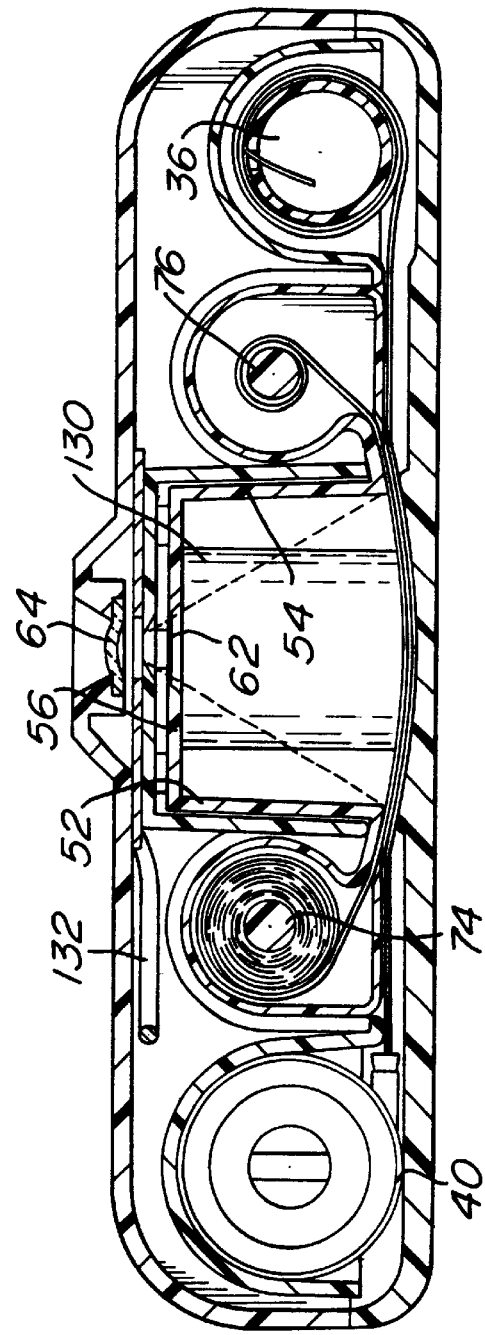

CAMERA WITH MEANS FOR SUPERIMPOSING IMAGES ON EXPOSURES

BACKGROUND OF THE INVENTION

This invention relates to a photographic camera that can create a composite image that includes the image of an object focused on by the camera user and an image chosen by the user from an image mask.

Photographic cameras can be used to form composite images that consist of a combination of an image on a transparency and an image of an object whose picture is being taken with the camera. For example, in U.S. Pat. No. 5,521,665 entitled "Composite Image Camera with Flash Device" the film exposure area, the area where a frame of film is exposed, is separated into two compartments. Light from the image of the object whose picture is being taken travels through one of the compartments to generate its image onto a portion of the frame of film adjacent to the film exposing area. A removable transparency with an image is disposed in the other compartment. Light from the camera flash travels through a light pipe to this second compartment. Therefore, when a picture is taken, the image on the transparency is transposed onto the portion of the frame of film adjacent to this second compartment to form a composite image.

Similarly, in U.S. Pat. No. 5,486,885 entitled "Character Image Display Apparatus for a Camera" a camera for forming a composite image is disclosed. In this camera, a transparency containing an image is adhesively placed onto a diffusion block disposed between a portion of a frame of film and the shutter. Light is directed into the diffusion block from the flash with a light guide. When a picture is taken, the flash illuminates the diffusion block and causes the image on the transparency to be placed on the film along with the image of the object whose picture is being taken.

The invention described below includes an improved camera for creating a composite image on a frame of film. In a preferred embodiment of this invention, the camera has a mask cartridge that contains a mask that has a plurality of prestored images. A camera user can select an image from these prestored images to combine with an image of the object whose picture is being taken to form a composite photograph.

SUMMARY OF THE INVENTION

The camera of this invention may include a main body, a back and a mask. The mask may be disposed on a mask cartridge that is removable from the camera. Preferably, the mask cartridge can be inserted and removed from the camera by opening the back cover. The mask may include a plurality of sections. Disposed on at least one of these sections is a mask object for generating a mask image on a frame of film. The camera of this invention can use any of a variety of types of film and preferably employs film that can be divided into a plurality of frames. Each frame preferably has a first portion on which an object image of an object whose picture is being taken can be created, and a second portion on which a mask image of a mask object disposed on the mask can be created. By creating an object image on the first portion of a frame of the film and a mask image on the second portion of the frame of film, a composite image can be created.

In a preferred embodiment of this invention, the camera further includes a first and a second film exposing chambers. These chambers may be defined within the mask cartridge. The first portion of a frame of film may be exposed to light from an object whose picture is being taken with the camera in the first film exposing chamber. In comparison, the second portion of the frame of film may be exposed in the second film exposing chamber to a mask object on the mask to create a mask image on the second portion of the frame of film. Preferably, the first and the second film exposing chambers are disposed adjacent to each other. For example, they may be disposed side by side or with the first film exposing chamber below the second film exposing chamber.

A light source may be provided in the second film exposing chamber for exposing the second portion of a frame of the film. The light source may be a light bulb. Alternatively, the light source may be the camera flash whose light is transmitted to the second film exposing chamber with a light pipe. In this embodiment, the second portion of a frame of film is exposed to the mask when the flash is triggered.

Preferably, if the light source is a light bulb, the light bulb may be disposed in a second film exposing chamber that is disposed between the first film exposing chamber and a film cassette. The camera may contain a means for activating the light source. In a preferred embodiment, the means for activating the light source includes the film advancing mechanism and an electrical circuit that powers the light source. This electrical circuit may, but need not, include a capacitor. In this embodiment, the first portion of the frame of film may be exposed in the first film exposing chamber to light from an object whose picture is being taken to form an object image on the first portion of the frame of film. After exposing the first portion of a frame of film, the film is preferably advanced with the film advancing mechanism. When the film is advanced, the frame of film that was exposed in the first film exposing chamber moves to the second film exposing chamber. After reaching the second film exposing chamber, the film advancing mechanism causes the electrical circuit to provide power to the light bulb and illuminate it. This may include discharging the capacitor to power the light source. When illuminated, the second portion of the frame of film is exposed to the mask object and a mask image of this mask object is created on the second portion of the frame of film. Thus, by exposing separate portions of a frame of film in separate exposing chambers, a composite image may be created in a frame of film.

The mask cartridge may include a first mask spool, a second mask spool and a mask advancing mechanism. The mask may be disposed on the first and the second mask spools, so that the mask may be scrolled between the first and the second mask spools. The mask advancing mechanism may include a thumb wheel that is coupled to each of the mask spools. Further, the mask cartridge may include a viewfinder mask that has a plurality of sections that each have images that correspond to the mask objects on the mask. The viewfinder mask may also be disposed on the first and the second mask spools so that it can be scrolled by operation of the mask advancing mechanism when the mask is scrolled.

In a first embodiment of this invention, the mask includes a plurality of first sections that are disposed adjacent to a plurality of second sections. The first sections have a first region and a second region. The first region of each of the first sections is transparent, and the second region of each of the first sections is masked. These first sections may be disposed in the first film exposing chamber between a frame of film and the lens of the camera. When a picture is taken with the camera, light from an object whose picture is being taken passes through the transparent first region of the first section of the mask to generate an image on a first portion of the frame of film. The second region of the first section of the mask prevents light from reaching the second portion of the frame of film and exposing the second portion of the frame of film.

Each of the second sections of the mask may have a first region and a second region. The first region of each of the second sections is masked so that light cannot penetrate it and expose the film. In contrast, the second region has at least one mask object. The mask object may be any of a variety of objects, including but not limited to words, symbols and images of people and objects.

After a picture is taken with the camera and the image of an object external to the camera is created on the first portion of the frame of film disposed in the first film exposing chamber, the film may be advanced with the film advancing mechanism. As the film advancing mechanism is manipulated, the frame of film that was in the first film exposing chamber moves to the second film exposing chamber. In the second film exposing chamber, a second section of the mask is disposed between the frame of film and the light source. Once the exposed frame of film is in the second film exposing chamber, the film advancing mechanism powers the light source, as described above. Because of the masked first region of the second section of the mask, the first portion of the frame of film that was exposed in the first film exposing chamber is not exposed. However, the second portion of the frame of film is exposed to light from the light source and a mask image of the at least one mask object on the second region of the second section of the mask is created. Thus, a composite image is generated on a frame of film; an object image of an object external to the camera is created in the first film exposing chamber and an at least one mask image is generated in the second film exposing chamber.

In this embodiment of the invention the creation of the object image on a first portion of a frame of film and the creation of a mask image on a second portion of a frame of film are independent functions of the camera. This is advantageous because a camera may select the mask object either before or after creating an object image on the first portion of the frame of film. More specifically, the camera user can expose the first portion of a frame of film and then operate the mask advancing mechanism to scroll through the mask objects and select a mask object. After selecting a mask object, the film can be advanced and the second portion of the frame of film may be exposed to the selected mask object, as described above. Alternatively, the camera user may select a mask object before exposing a first portion of a frame of film and operate the film advancing mechanism to create the mask image of the composite image.

In some cameras it may be desired to prevent a camera user from changing a selected mask object after an object image has been created and before the film has been exposed to the selected mask object. This may be desired because the camera user could take a picture, inadvertently forget to advance the film, change the mask image to one, that does not correspond to the object image, and then advance the film. Such a sequence of events would create a composite image that includes a mask image that does not correlate with the object image. In order to prevent this, the camera may have an interlock, that prevents the camera user from changing the selected mask image after an object image has been created until the film is exposed to the selected mask image. Although a camera that has this interlock prevents the creation of an undesired composite image, it requires the camera user to select a mask image before taking a picture of an object.

In an alternative embodiment of this invention, the mask cartridge has a mask that has a plurality of sections. Each of these sections is divided into a first region and a second region. The first region of each of these sections is transparent, and the second region of each of these sections has at least one mask object. This alternative embodiment may be used with an embodiment of the camera of this invention that has a first film exposing chamber disposed above a second film exposing chamber. Preferably, the first and the second film exposing chambers are defined at least in part by a mask shield that is part of the mask cartridge. The mask shield divides an area of the camera into the two chambers, a first and a second film exposing chamber.

The mask may be disposed in these chambers between the film and the front of the camera. Even more preferably, the first region of a section of the mask may be disposed in the first film exposing chamber above the mask shield, and the second region of the mask may be disposed in the second film exposing chamber, below the mask shield. The light pipe, described above, may extend from the flash of the camera to the second film exposing chamber. When a picture is taken with the camera and the flash is activated, light reflected from an object whose picture is being taken with the camera enters the camera through a lens of the camera into the first film exposing chamber and exposes the first portion of a frame of film. Because of the mask shield, the second portion of the frame of film in the second film exposing chamber is not exposed to light that enters the camera through the camera lens. Rather, when the picture is taken and the flash is activated, light from the flash travels through the light pipe to the second film exposing chamber. This light form the flash exposes the second portion of the frame of film and creates an image of the mask object on the second portion of the frame of film. Thus, in this embodiment of the invention, a composite image is created when a picture is taken by activating the flash. A light bulb or other illuminating device may be uses as the source of light for illuminating the second film exposing chamber instead of a flash.

Because the first and the second film exposing chambers are disposed in a vertical relationship, rather than side by side, this second preferred embodiment is advantageous because it may be relatively small in size. In some instances, camera users prefer smaller size cameras and this embodiment of the camera helps to meet that demand.

Other features of the invention are provided below.

BRIEF DESCRIPTION OF DRAWINGS

FIG. 5 is a cross-sectional view of a preferred embodiment of the camera of FIG. 4;

FIG. 6 is a cross section taken through line 6—6 of FIG. 5;

FIG. 7 is a cross section taken through line 7—7 of FIG. 5;

FIG. 8 is a cross section taken through line 8—8 of FIG. 5;

FIG. 9 is a cross section taken through line 9—9 of FIG. 5;

FIG. 10 is a first diagrammatical view of the operation of the preferred embodiment of FIG. 4;

FIG. 11 is a second diagrammatical view of the operation of the preferred embodiment of FIG. 4;

FIG. 13B is a diagrammatical view of the preferred embodiment of FIG. 4 with the interlock of FIG. 13 in a disabled position;

FIG. 14 is a diagrammatical view of the preferred embodiment of the camera of FIG. 2;

FIG. 16 is a cross section taken through line 16—16 of FIG. 15;

FIG. 17 is a cross section taken through line 17—17 of FIG. 15;

DETAILED DESCRIPTION OF THE PREFERRED EMBODIMENTS

Figure 1:
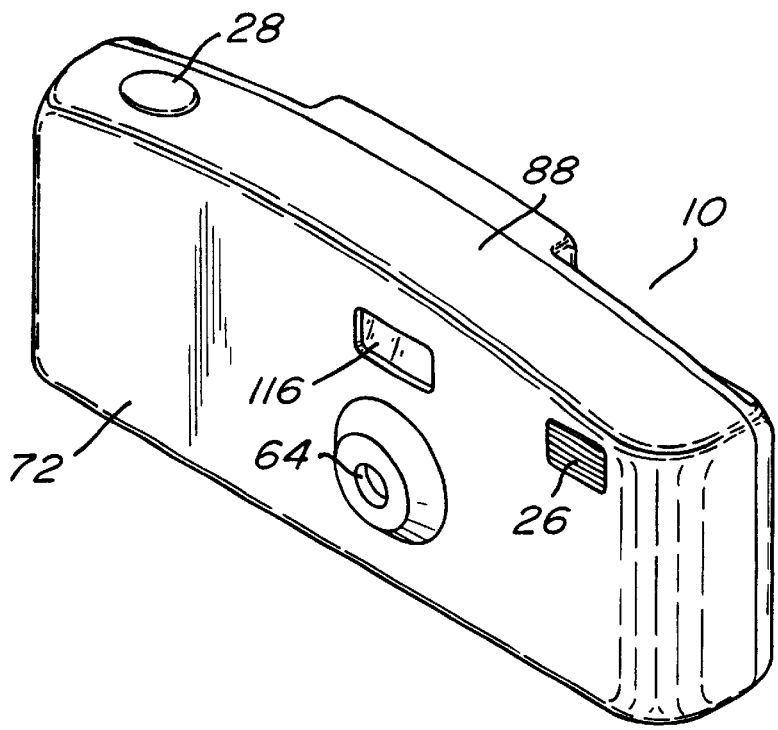
FIG. 1 is a perspective view of an exterior of a camera of this invention.
Figure 2:
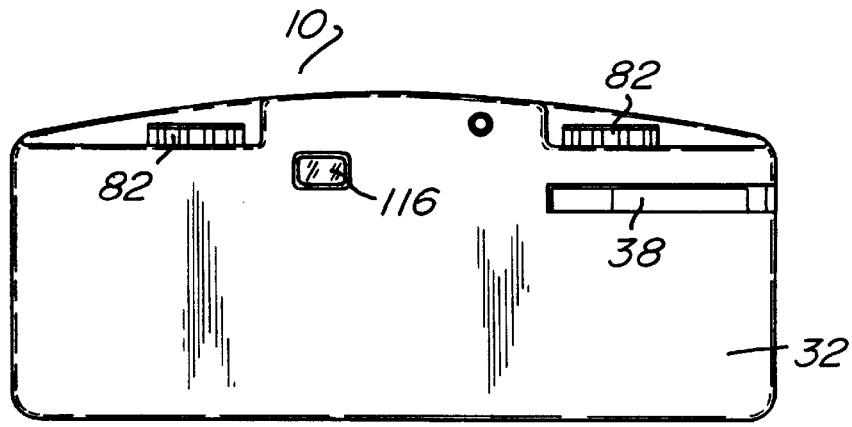
FIG. 2 is a preferred embodiment of the back of the camera of FIG. 1.
Figure 3:
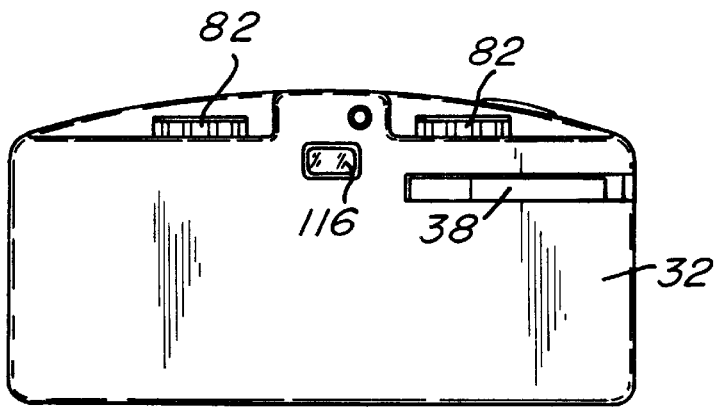
FIG. 3 is another preferred embodiment of the back of the camera of this invention.
Figure 19:
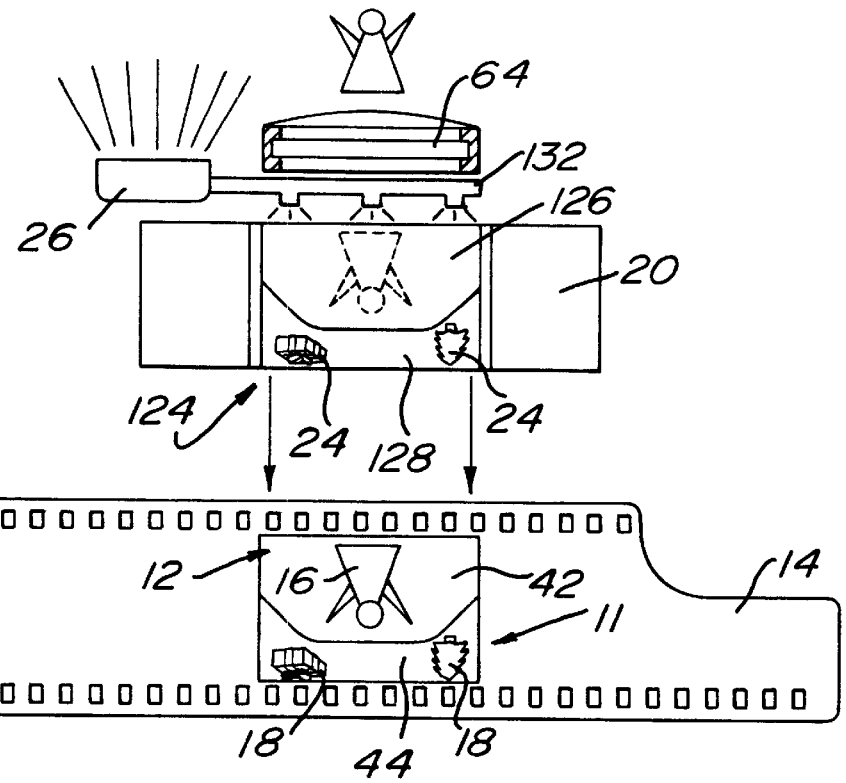
FIG. 19 is a first diagrammatical view of the operation of the preferred embodiment of FIG. 14.
Figure 20:
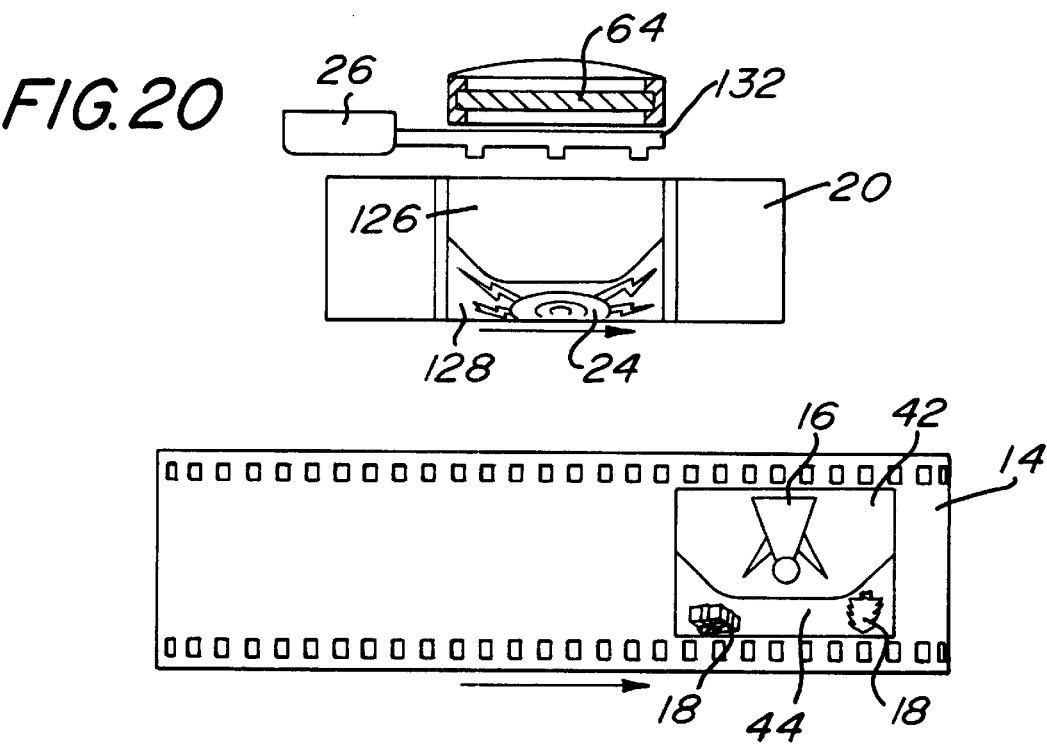
FIG. 20 is a second diagrammatical view of the operation of the preferred embodiment of FIG. 14.

By way of overview, the camera 10 of this invention can create a composite image 11 on a frame 12 of camera film 14. The composite image 11 preferably includes an object image 16 of an object external to the camera 10, and a mask image 18 of an object stored on a mask 20 within the camera 10. After a composite image is created on a frame 12 of film 14 with the camera 10 of this invention, the frame 12 of film 14 can be developed to form a picture that has a composite image 11, such as that shown in FIGS. 11–13 and 19–20. Two embodiments of the camera 10 of this invention for creating a composite image on a frame 12 of film 14 are described below. FIGS. 1–3 depict the exterior portions of both of these preferred embodiments of the camera 10. FIG. 1 depicts the top and the front 72 of a first embodiment of the camera 10 of this invention. FIG. 2 depicts the back of the first preferred embodiment of this invention, and FIG. 3 depicts a back of a second preferred embodiment of the camera of this invention. Although the front and top 72 of the second preferred embodiment are not shown, it will be appreciated that it has features that are similar to those shown in FIG. 1 but will be proportionally sized to the back of the camera shown in FIG. 3, which is smaller than the camera shown in FIG. 3, which is smaller than the camera shown in FIGS. 1 and 2 for reasons detailed below. FIGS. 4–9 depict the structure of the first preferred embodiment of this invention, and FIGS. 10–13 illustrate the operation of this first preferred embodiment. In comparison, FIGS. 14–18 depict a second preferred embodiment of this invention, and FIGS. 19–20 illustrate the operation of this second preferred embodiment. In both of the embodiments illustrated, the camera 10 of this invention contains a mask cartridge 22 that has a mask 20. The mask 20 has at least one mask object 24 whose image can be created on the film 14. In order to create a composite image 11 on a frame 12 of film 14, the frame 12 of film 14 is exposed to light from both an object that is external to the camera 10 and a mask object 24 on the mask 20.

The following discussion applies to both embodiments of the camera 10 of this invention alluded to above. As shown in FIG. 1, the camera 10 may have a flash 26 and a picture taking mechanism 28, such as a button. The flash 26 can be used to create a composite image 11 on a frame 12 of film 14 in a preferred embodiment of this invention. Further operation of the flash 26 and the picture taking mechanism 28 is provided below.

Figure 4:
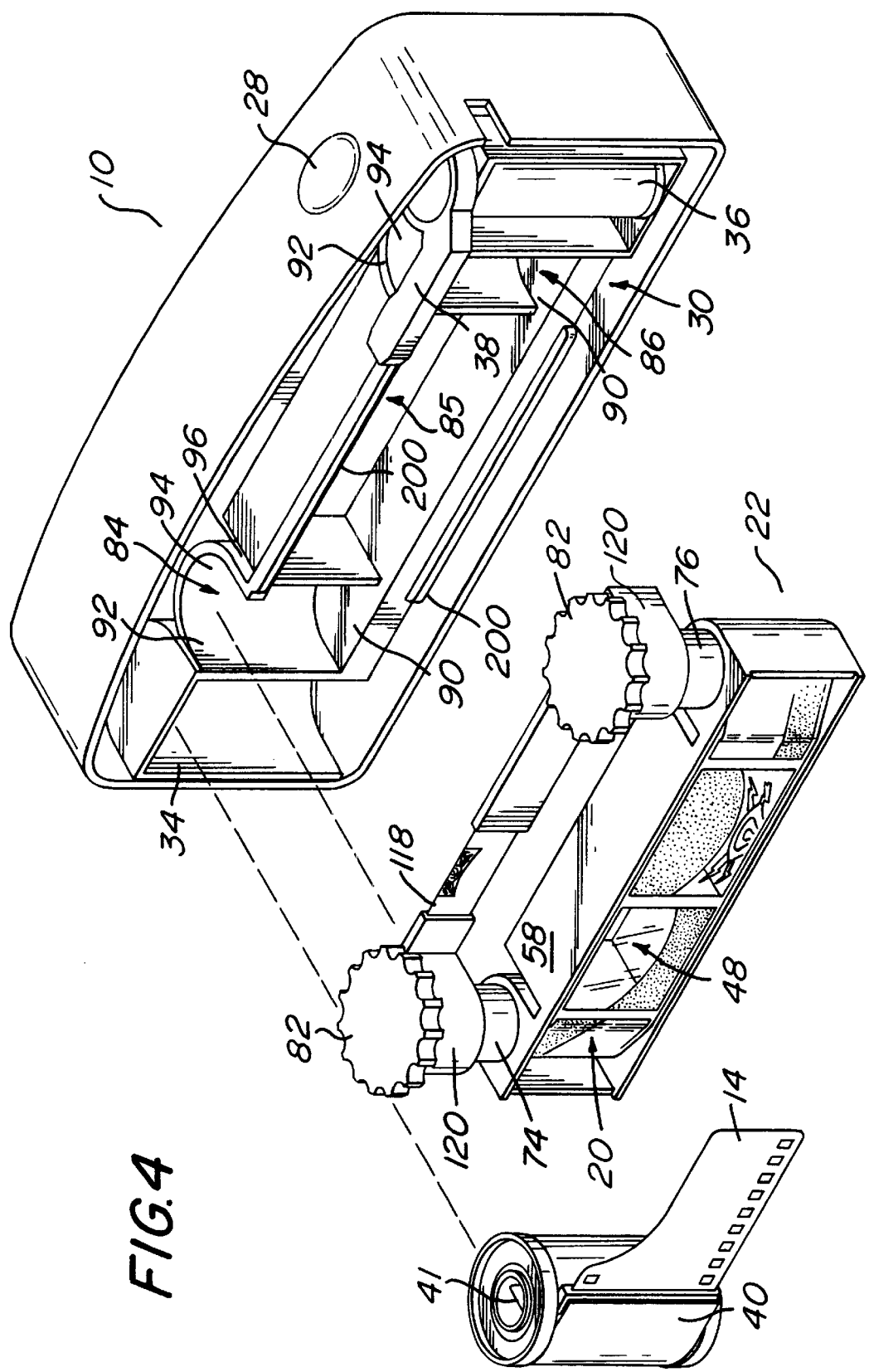
FIG. 4 is a diagrammatical view of a preferred embodiment of the camera of FIG. 1.

As is typical, the camera 10 may also have a main body 30, as shown in FIGS. 4 and 14, and a back cover 32, as shown in FIGS. 2 and 3, that can be fitting together with snaps, adhesives, tabs and/or the like. Although in the embodiment shown the main body 30 is a single molded piece, the main body 30 may be formed by attaching several pieces together. The camera 10 may also have a film receiving area 34, a film spool 36 and a film advancing mechanism 38. The film receiving area 34 is defined by an area between the main body 30 and the back cover 32. However, the camera 10 of this invention is not limited to this design. For example, the film receiving area 34 may be defined within the main body 30.

Preferably, the film receiving area 34 can receive a film cassette 40 which may be of any of a variety of types of film, including but not limited to, 35 mm. film and advanced photo system (APS) film. As is generally known, advanced photo system film is contained in a film cassette having a light lock door. Depending on the type of camera, the film cassette 40 may be placed into the film receiving area 34 either before or after the back cover 32 is affixed to the main body 30. In the embodiment shown, the film cassette 40 may be placed in the camera 10 before the back cover 32 is attached to the main body 30. If the film cassette 40 is placed in the camera 10 after the main body 30 and the back cover 32 are affixed to each other, the cassette 40 may be received into the camera 10 through a door, tab or other similar means (not shown) in the bottom of the camera 10.

Despite the type of film that is employed, the film 14 may have one or more frames 12 from which a photographic picture may be developed. As described in more detail below, each frame 12 of film 14 can preferably be divided into a plurality of portions, so that each portion of each frame can be exposed to a different image to create a composite image 11 on a single frame 12 of film 14. Preferably, each frame 12 of film 14 can be divided into two portions, a first portion 42 and a second portion 44.

Disposed within the main body 30 of the camera 10 may be the film spool 36. The film spool 36 is preferably rotatably mounted to the main body 30, so that film 14 from a film cassette 40 may be wound around the spool 36. For instance, the film cassette 40 may be inserted into the camera 10 and then the film 14 may be advanced by the advancing mechanism 38, described below, to the film spool 36. When pictures are taken with the camera 10, the film 14 may be advanced from the film cassette 40 to the film spool 36 with the advancing mechanism 38, as shown in the embodiment of FIG. 4. After all of the pictures have been taken, the film 14 may be wound back within the film cassette 40 and the film cassette 40 may be removed from the camera 10, so that the film 14 can be developed.

As alluded to above, the camera 10 may also have a film advancing mechanism 38. A variety of film advancing mechanisms 38 may be used with the camera 10 and the invention is not limited to the embodiment of the film advancing mechanism 38 illustrated. By way of example and not by way of limitation, the film advancing mechanism 38 may be manual or motorized. In the first and second preferred embodiments shown, the film advancing mechanism 38 includes a manual lever, as best shown in FIGS. 4 and 14, that can be coupled to the film spool 36 to rotate the spool 36, and thereby move the film out of the film cassette 40. In an alternative embodiment, the film advancing mechanism 38 can be coupled to the film cassette 40, as opposed to the film spool 36. In order to rewind the film back into the film cassette, a rewind mechanism is coupled to the film cassette. Although the rewind mechanism is not shown, it will be appreciated that any of a variety of conventional mechanisms may be employed. In still another preferred embodiment, the film advancing mechanism 38 may be a manual thumb wheel

FIRST PREFERRED EMBODIMENT

The following discussion applies mainly to the embodiment of FIGS. 4–9, but in some instances also applies to the embodiment of FIGS. 14–18. The embodiment of FIGS. 4–9 may further include a first 48 and a second 50 film exposing chamber. As best shown in FIG. 5, in a preferred embodiment the first 48 and the second 50 film exposing chambers are disposed side by side, and are defined within the mask cartridge 22. In an alternative embodiment (not shown), the first and the second film exposing chambers are defined within the main body 30 of the camera, as opposed to within the mask cartridge 22. When the mask cartridge inserted into the camera 10, the first film exposing chamber 48 is disposed between the film cassette receiving area 34 and the second film exposing chamber 50. In comparison, the second film exposing chamber 50 is disposed between the first film exposing chamber 48 and the film spool 36. The first and the second film exposing chambers 48, 50 may be molded plastic. Further, the first 48 and the second 50 film exposing chambers may each have a first side, 52 a second side 54, a third side 56, a top 58 and a bottom 60, as shown in FIGS. 4–9. The first side 52 of the first film exposing chamber 48 may have a window 62 for emitting light from the camera lens 64 to the first film exposing chamber 48. Most preferably, the second side 54 of each of the film exposing chambers 48, 50 is defined by the same structure, as shown in FIG. 7. This structure separates the first 48 and the second 50 film exposing chambers, so that light from one compartment cannot enter the other compartment. This prevents film 14 in the first film exposing chamber 48 from being exposed to light from the second film exposing chamber 50, and film 14 in the second film exposing chamber 50 from being exposed to light from the first film exposing chamber 48.

As best shown in FIG. 7, the third side 56 of the first and the second film exposing chambers 48, 50 may be defined by a portion of the main body 30 of the camera 10. When the back cover 32 is attached to the main body 30, the back cover 32 forms the fourth side of the first and the second film exposing chambers 48, 50, as can best be seen in FIG. 7. A first opening 66 is defined between the back cover 32 and the first side 52 of the first film exposing chamber 48, and a second opening 68 is defined between the second side 54 of the first film exposing chamber 48 and the back cover 32. The mask 20 and the film 14 can move into and out of the first film exposing chamber 48 through both the first opening 66 and the second opening 68.

A third opening 70 is defined between the first side 52 of the second film exposing chamber 50 and the back cover 32. Since the second side 54 of each of the film exposing chambers 48, 50 is defined by the same structure, the mask 20 can move into and out of the second film exposing chamber 50 through the second 68 and the third 70 openings. Similarly, the film can move into and out of the second film exposing chamber 50 through the second opening 68 and the third opening 70, as best shown in FIG. 7.

The lens 64 of the camera 10, which is best seen in FIGS. 1, 7 and 8, through which the film 14 may be exposed to an object that is external to the camera 10 may be disposed in the front 72 of the camera 10. This lens 64 is preferably disposed in the front of the camera so that it aligns with the window 62 of the first film exposing chamber 48.

As alluded to above, the camera 10 of this invention may have a removable mask cartridge 22. Two embodiments of the mask cartridge 22 of this invention are provided for purposes of illustration. In the first preferred embodiment of this invention, which is best shown in FIG. 4, the mask cartridge 22 may have a first mask spool 74, a second mask spool 76, a mask advancing mechanism 82 and a first and a second film exposing chambers 48, 50 which were described above. Disposed within the main body 30 of the camera 10 may be an area for receiving the mask cartridge 22. This area may include a first mask spool receiving area 84, a second mask spool receiving area 86 and a film chamber receiving area 85. Preferably, the first mask spool receiving area 84 is disposed between the film cassette receiving area 34 and the film chamber receiving area 85. The second mask spool receiving area 86 is preferably disposed between the second film exposing chamber 50 and the film chamber receiving area 85.

Each of the mask spool receiving areas 84, 86 may have a top that is defined by a top 88 of the main body 30 or other structure, such as a cover of the camera 10. A bottom 90 of each of the mask spool receiving areas 84, 86 may be defined by a portion of the main body 30. In addition, each of the mask spool receiving areas 84, 86 may have a first 92, a second 94 and a third side 96. These sides 92, 94, 96 may be curved to form circular sides of the mask spool receiving areas 84, 86. The first 92, the second 94 and the third sides 96 of the mask spool receiving areas 84, 86 may be defined by a portion of the main body 30. The back cover 32 of the camera 10 preferably enclosed the mask spool receiving areas 84, 86. As is described below, the mask cartridge 22 is insertable into the camera 10, so that each of the mask spool receiving areas 84, 86 can receive one of the mask cartridge spools 74, 76. In addition, the mask cartridge 22 is preferably sized so that when the mask cartridge 22 is inserted into the camera, the film exposing chambers 48, 50 are received into the film chamber receiving area 85. The film chamber receiving area 85 is preferably defined within the main body 30 of the camera 10, as best shown in FIGS. 4 and 7.

As is best depicted in FIG. 4 and as alluded to above, a preferred embodiment of a mask cartridge 22 of this invention, preferably includes a mask 20, a first mask spool 74, a second mask spool 76 and a mask advancing mechanism 82. The first mask spool 74 and the second mask spool 76 are preferably disposed at opposing ends of the mask cartridge 22. The mask 20 preferably extends from the first mask spool 74 to the second mask spool 76. These mask spools 74, 76 are preferably rotably mounted to the mask cartridge 22. When rotated, the mask 20 moves between the mask spools 74, 76. As mentioned above, the mask cartridge 22 may further include a mask advancing mechanism 82. In the embodiment shown the mask advancing mechanism 82 includes a pair of thumb wheels. Each of these thumb wheels 82 are preferably/connected to one of the mask spools 74, 76. By manipulating the mask advancing mechanisms 82, the mask 20 may be moved between the mask spools 74, 76.

In the embodiment shown in FIGS. 4–9, the mask 20 has a plurality of sections, as is best shown in FIGS. 10–13. The mask is preferably a homogenous or celluloid photo sensitive material that includes black or non-transparent regions and white or transparent regions. FIGS. 10–13 illustrate diagrammatically the exposure of the film in the first and second film exposing chambers 48, 50. Within this plurality of sections is a first section 100 that is adjacent to a second section 102. The first section 100 has a first region 104 and a second region 106. The second region 106 is preferably a black or non transparent that masks film by preventing light from passing through it. As is described in further detail below, the first section 100 of the mask 22 maybe disposed in the first film exposing chamber 48 in between a frame 12 of film 14 and the lens 64 of the camera 10, so that the second region 106 of the first section 100 of the mask 20 masks the second portion 44 of the frame 12 of film 14 when the film 14 is exposed to light from an object that is external to the camera 10. The first region 104 of the first section 100 of the mask 20 is white or transparent and permits the film 14 to be exposed to light reflected from the object that is external to the camera 10, and thereby permits an object image of the object to be created on a first portion 42 of the frame 12 of film 14.

The second section 102 of the mask 20 also has a first region 108 and a second region 110. The first region 108 of the second section 102 is black or non transparent and functions to mask the film 14 from light, and the second region 110 is white or transparent and has at least one mask object 24 for creating a mask image on the film 14. This second section 102 of the mask 20 may be disposed in the second film exposing chamber 50. As is described below, after a picture is taken with the camera 10 and an object image is created on the first portion 42 of the frame 12 of film 14, this frame 12 can be advanced until it is disposed between the second section 102 of the mask 20 and a light source 112. When the light source 112 is activated, as described below, the second portion 44 of the frame 12 of film 14 is exposed to light that creates an image of the mask object 24, that is on the second region 110 of the second section 102 of the mask 20, on the second portion 44 of the frame 12 of film 14. Thus, by using the mask 20 of the mask cartridge 22 a composite image of an object image and a mask image can be created on a frame 12 of film 14.

As alluded to above the mask 20 on the mask cartridge 22 may have a plurality of sections. Preferably, the sections of the mask 20 are alternating, so that every other section is similar to the first section 100 and every section that is adjacent to a first section 100 is similar to a second section 102. By alternating the sections on the mask, a section that is similar to the first section 100 may be disposed in the first film exposing chamber 48 when a second section 102 is disposed in the second film exposing chamber 50.

Disposed within the second film exposing chamber 50 is a light source 112, as shown in FIGS. 7 and 9. The light source 112 may be a light bulb or any suitable source of light. Although the light source may be disposed in a plurality of locations within the second film exposing chamber 50, in a preferred embodiment, the light source 112 is disposed on a portion of the main body 30, as shown in FIGS. 7 and 9. The light source 112 may be coupled to an electrical circuit that provides a source of electrical power for the light source 112, as best shown in FIG. 6. This electrical circuit may include a capacitor 114 that discharges to power the light source 112, but it need not have a capacitor 114 and this example of a power source is provided by way of example. Preferably, the light source is operated by the film advancing mechanism 38 and is coupled to the light source 112 by electrical contacts 115. In order to control the operation of the capacitor 114, the film advancing mechanism 38 may be a lever that operates with the contacts 115. The lever 38 causes the capacitor 114 to fire and provide power to the light source 112. When the lever 38 is in the position shown in FIG. 6, the contacts 115 are held open by the lever 38 and the capacitor 114 is decoupled from the light source, so that the capacitor 114 does not provide electrical power to the light source 112. The lever 38 causes the capacitor 114 to provide power to the light source 112 when the lever 38 is manipulated after a picture has been taken. When the lever 38 is manipulated or rotated and the film has been transferred from the first film exposing chamber 48 to the second film exposing chamber 50, the lever 38 releases the contacts 115 to close them and this activates the capacitor 114 to supply electrical power to the light source 112 and expose the film in the second film exposing chamber 50.

In the embodiment illustrated in FIGS. 4–9, the camera 10 also includes a pair of viewfinder windows 116. As is typical, the viewfinder window 116 is constructed from a transparent material so that the camera user can focus the camera 10 on an object whose picture will be taken. The mask cartridge 22 also employs a viewfinder mask 118. Disposed on the viewfinder mask 118 are images that correspond to those contained on the mask 20. When the mask cartridge 22 is placed into the camera 10, the viewfinder mask 118 extends between the viewfinder windows 116. Preferably, one image on the viewfinder mask 118 can be seen through the viewfinder windows 116. Therefore, upon looking through the viewfinder windows 116, the camera user will see an image from the viewfinder mask 118 in part of the viewfinder window 116 and the object being focused on in the other part of the viewfinder window 116.

As is depicted in FIG. 4, the viewfinder mask 118 may be disposed on a pair of viewfinder mask spools 120 that are each mounted on a common shaft with one of the first and the second mask spools 74, 76. These spools are each connected to the mask advancing mechanism 82. As mentioned above, rotation of one or both of the mask advancing mechanism 82 will cause the mask 20 and its images to be moved from spool 74 to spool 76 and through the film exposing chambers 48, 50. In addition, rotation of the one or both of the mask advancing mechanism 82 will cause the viewfinder mask 118 to be transferred and from one viewfinder mask spool 120 to the other and between the viewfinder windows 116. Preferably, the mask 20 and the viewfinder mask 118 are sized and shaped so that when an image on the mask 20 is in the second film exposing chamber 50, its corresponding image on the viewfinder mask 118 is displayed in the viewfinder windows 116, as shown in FIG. 5.

As best shown in FIGS. 4, 6 and 9, the main body 30 may have a pair of film rails 200 which defines a film path 202, as shown in FIG. 7, between the film cassette 40 and the film spool 36. The film path 202 includes the region in which film travels and is defined by the film rails 200, the back cover 32, the mask cartridge 22, the film cassette 40 and the film spool 36. The film 14 travels in this film path 202 between the film cassette 40 and the film spool 36. The camera 10 may further include a pressure plate 203 on the back cover 32 which also defines the film path 202. As shown, in FIGS. 7–9, it is preferable that the film path 202 is defined so that the film does not contact the mask 20 and thereby inhibit the movement of either the mask 20 or the film 14. A pair of mask rails 205 may also be included for defining a path for the mask 20 to follow as it travels between the mask spools. These rails 205 may be integrally formed with the mask cartridge 22.

The operation of the camera 10 is best understood with reference to the sequence of images shown in FIGS. 10–13. These Figures begin with a film cassette 40 loaded into camera and the film loaded onto the film spool 36, so that a frame 12 of film 14 is disposed in the first film exposing chamber 48, as show diagrammatically in FIG. 10. In addition, the camera user has scrolled the mask 20 and selected a mask image 24 from the mask cartridge 22 by looking at the viewfinder mask 118 in the viewfinder windows 116. It will be understood that the relative placement of the mask 20 and the film 14 shown in FIGS. 10–13 is that as it occurs when a composite image is being created with the camera 10. That is, the mask 20 is disposed in between the film 14 and the object whose picture is being taken.

The selected mask object 24 is shown in FIG. 10. By way of example, the mask object 24 is a sun. However, the mask object 24 may take almost any form which includes, but is not limited to words, numbers and images of objects or animals. As shown in FIG. 10, the mask object 24 is on the second region 110 of the second section 102 of the mask 20. This second section 102 of the mask 20 is disposed in the second film exposing chamber 50 in between the film 14 and the light source 112. The first section 100 of the mask 20 is disposed in the first film exposing chamber 48 between the lens 64 and the film 14.

After focusing on an object whose picture is being taken, the camera user takes a picture with the camera by operating the picture taking mechanism 28. When a picture is taken with the camera 10, a first portion 42 of the frame 12 of film 14, disposed in the first film exposing area 48, may be exposed and an object image 16 of an object external to the camera 10 may be created on the first portion 42 of the frame 12 of film 14. As shown in FIG. 10, the first section 100 of the mask 20 is disposed in between the frame of film in the first film exposing area 48 and the camera lens 64. By placing the second region 106 of the mask 20 in between the film 14 and the lens 64, the second region 106 of the mask 20 masks a second portion 44 of the frame 12 of film 14 in the first film exposing chamber 48, so that the second portion 44 of the frame 12 of film 14 is not exposed in the first film exposing chamber 74. As described above, the first region 104 of the first section 100 of the mask 20 is transparent so that the first portion 42 of the frame 12 of film 14 can be exposed in the first film exposing chamber 48. In contrast, the second region 106 of the first section 100 of the mask 20 is not transparent and masks the second portion 44 of the frame 12 of film 14, so that the second portion 44 of the frame of film 14 is not exposed in the first film exposing chamber 48. Thus, in the first film exposing chamber 48 a first portion 42 of a frame 12 of film 14 may be exposed to create an object image 16 on the first portion of the frame 12 of film 14, and a second portion of the frame 12 of film 14 may be masked, so that it is not exposed.

After the first portion of the frame 12 of film 14 is exposed in the first film exposing chamber 48, the frame 12 of film 14 may be advanced to the second film exposing chamber 50, as shown in FIG. 11. As shown in FIG. 11, the mask 20 remains stationary and has not moved. However, the camera user can scroll the mask 20 with the mask advancing mechanism 82 and select a different mask image to place in the second film exposing chamber 50 before advancing the frame of film to the second film exposing chamber 50. In order to do this, the camera user can examine the images on the viewfinder mask 118 through the viewfinder window 116 that correspond to the mask objects contained on the mask 22. In the second film exposing chamber 50, a second section 102 of the mask 20 is disposed in between the frame 12 of film 14 and the light source 112. As alluded to above, the second section 102 of the mask 20 has a first region 108 that masks the frame 12 of film 14 and in particular the first portion 42 of the frame 12 of film 14 that has an object image 16. The second region 110 of the second section 102 of the mask 20 has at least one mask object. When the light source 112 is illuminated as described above by advancing the film 14, the second portion 44 of the frame of film 14 is exposed to light from the light source 112 and the mask object 24 on the second region 110 of the second section 102 of the mask 20 is created on the second portion 44 of the frame 12 of film 14. Thus, after being exposed in the first 48 and the second 50 film exposing chambers, a composite image is created on the film 14 that includes an object image 16 and a mask image 18.

Figure 12:
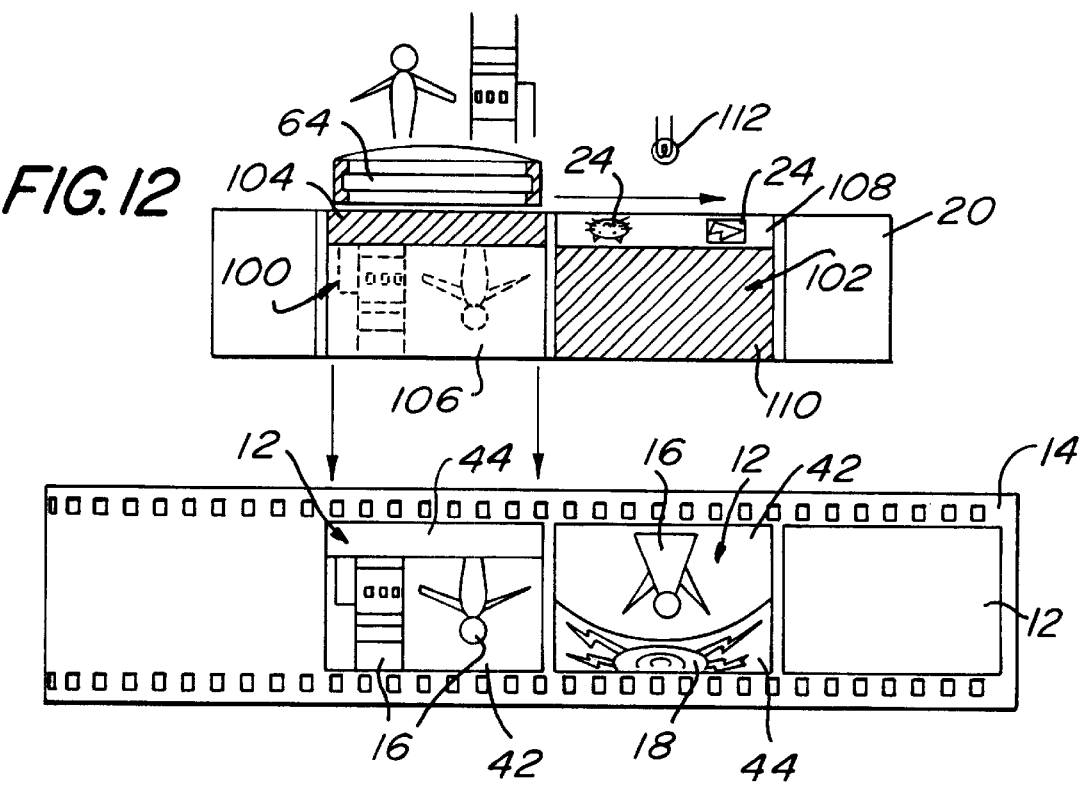
FIG. 12 is a third diagrammatical view of the operation of the preferred embodiment of FIG. 4.

After the composite image shown in FIG. 11 has been created, the film remains in the position shown in FIG. 11 and the camera user can then select the same or another mask image to be created on the next frame of film. By operating the mask advancing mechanism 82 and examining the mask images on the viewfinder mask 118, the camera user can select a mask image. FIG. 12 depicts the selected mask image as a cat and a symbol. However, as described above the mask images can take almost any form and these mask images are provided by way of example and not by way of limitation.

Once a mask image is selected, the camera user can focus on another object that is external to the camera and take a picture of this object. When a picture of this object is taken, a portion 42 of the frame 12 of film 14 in the first film exposing chamber 48 is exposed to light from the object and the image of the object is created on a first portion of the frame of film, as shown in FIG. 12.

Figure 13:
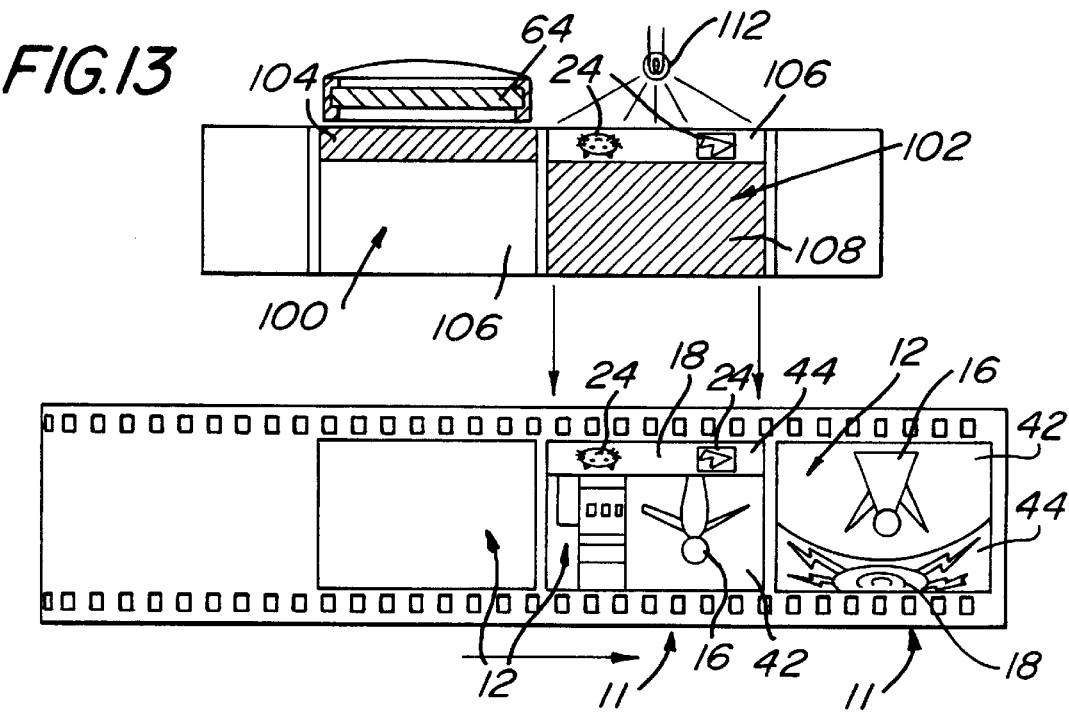
FIG. 13 is a fourth diagrammatical view of the operation of the preferred embodiment of FIG. 4.

Following the creation of an object image 16 on the frame 12 of film 14, the film 14 can then be advanced with the film advancing mechanism. By operating the film advancing mechanism, the film is advanced so that the frame of film that was in the first film exposing chamber 48 is advanced to the second film exposing chamber 50, as shown in FIG. 13. After the frame of film has been advanced to the second film exposing chamber 50, the film advancing mechanism 38 activates the light source 112, as described above. This includes coupling the light source 112 in the second film exposing chamber 50 to the capacitor 114 with the contacts 115. When the light source 112 is activated, the light source 112 illuminates and exposes the second portion 44 of the frame 12 of film 14 to the selected mask object 24. This creates a mask image 18 on the second portion 44 of the frame 12 of film 14, as shown in FIG. 13. Thus, a composite image has been formed on the frame 12 of film 14 that includes an object image 16 of an object that is external to the camera and a mask image 18 of the selected mask object 24.

The electrical contacts are designed with a spring contact or other timing feature that permits the light source to illuminate after the lever 38 has been rotated sufficiently to move the frame of film 14 from the first film exposing chamber 48 to the second film exposing chamber 50.

Instead of exposing the frame 12 of film 14 to the mask object 24 that was selected prior to taking the second picture, the camera user can select another mask image after taking the picture but prior to advancing the film. The camera user can select another mask image by operating the mask advancing mechanism 82 and viewing the mask objects through the viewfinder window 116.

INTERLOCK MECHANISM

In the embodiment described above, the camera user could select a mask object after a picture of an object has been taken, but before the film was advanced to expose the film to a mask image. This embodiment provides the camera with the benefit of permitting the camera user to select a mask object after a picture is taken under circumstances when the camera user does not have time to select a mask object before taking a picture. The potential disadvantage of this embodiment is that a camera user could take a picture, inadvertently forget to advance the film, change the mask object to one, that does not correspond to the object image, and then advance the film. Such a sequence of events would create a composite image that includes a mask image that does not correlate with the object image. In order to prevent this, the camera may have an interlock 300, that prevents the camera user from changing the selected mask object after an object image has been created until the film is exposed to the selected mask object. Although a camera that has this interlock prevents the creation of an undesired composite image, it requires the camera user to select a mask object before taking a picture of an object.

Figure 13A:
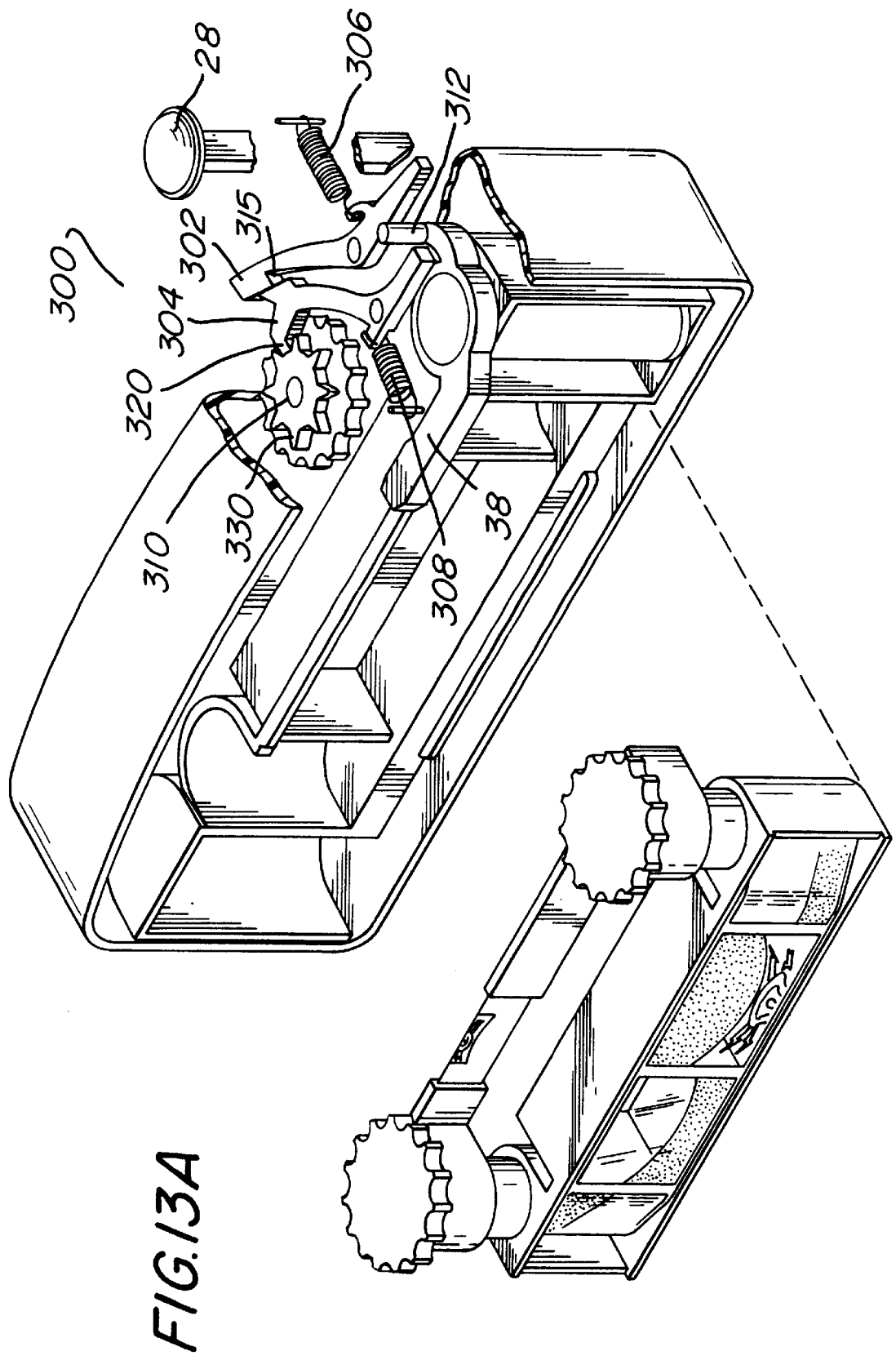
FIG. 13A is a diagrammatical view of the preferred embodiment of FIG. 4 with an interlock in an enabled position.

The interlock 300 is illustrated in FIGS. 13A and 13B and may in a preferred embodiment include the advance lever 38, a first interlock lever 302, a second interlock lever 304, a first spring 306, a second spring 308 and an interlock wheel 310. FIG. 13A illustrates the interlock 300 in an enabled position, in which movement of the mask is prevented, and FIG. 13B depicts the interlock 300 in a disabled position, in which movement of the mask is permitted.

The advance lever 38 is rotatable mounted to the main body and may have a finger 312 extending from a projecting portion 314, as best shown in FIG. 13B. The projecting portion 314 may be curved, so that the finger 314 contacts the second interlock lever 304, as the advance lever 38 is rotated. As shown in phantom in FIG. 13B, the advance lever 38 may be rotated from a first position to a second position. When the advance lever 38 is rotated, film is moved to the film spool, as described above. While the advance lever 38 is in the first position, the interlock 300 may be enabled, as depicted in FIG. 13A and discussed further below. When the advance lever 38 is moved to the second position, the finger 314 contacts the second interlock lever 304 to move the second interlock lever 304 and thereby disable the interlock 300, as the lever 38 is moved to its second position.

The first interlock lever 302 is rotatably mounted to the camera and has an indentation 315 for interfacing with the second interlock lever 304. The first interlock lever may further include a protrusion 316. The first spring 306 is preferably attached to this protrusion 316 and to a pin 318, that is affixed to the main body of the camera 10. The spring 306 biases the first interlock lever 302 to rotate counter clockwise, as viewed in FIGS. 13A and 13B. Although the first spring 306 is illustrated as a helical spring, other embodiments may be utilized. For example, a leaf spring may be employed.

The picture taking mechanism 28 is illustrated as a push button in FIGS. 13A and 13B and is illustrated diagrammatically as having a broken shaft 28a. An end of the shaft 28a may have an angled surface 28b for interfacing with the first interlock lever 302 to enable the interlock 300, as described in further detail below, when the picture taking mechanism 28 is activated by the camera user.

Similar to the first interlock lever 302, the second interlock 304 may be rotatably mounted to the main body 30. Preferably, the second interlock lever 304 is rotatably mounted about pivot point 319. The second interlock lever 304 may have a first end 320, a second end 322, a claw 324 and hook 326. The hook 326 extends from the second interlock lever 304, so that the second spring 308 may be coupled to the second interlock lever 304. The second spring 308 is also coupled to a member 328, so that the second spring 308 biases the second interlock lever 304 to rotate in the counter clockwise direction, as viewed in FIGS. 13A and 13B. In the preferred embodiment shown, the second spring 308 is helical. However, other embodiments, for example a leaf spring, may be employed.

The second end 320 defines a member for engaging the interlock wheel 310. When engaged with the interlock wheel 310, rotation of the mask advancing mechanism 82 is prevented. Therefore, with the second end 320 engaged with the interlock wheel 310, the camera user cannot change the selected mask object. As described below, the interlock wheel 310 is engaged with the second end 320 of the second interlock lever 304 after a picture has been taken, but before the film has been advanced to expose the film to the mask.

As illustrated in FIG. 13B, the claw 324 is engageable with the indentation 315. The claw 324 engages the indentation 315 in response to rotation of the advance lever 38. When engaged with the indentation 315, the second interlock lever 304 is held out of engagement with the interlock wheel 310 by the first interlock lever 302 against the biasing of the second spring 308. Additionally, the first interlock lever 302 is held in a rotational position against the biasing of the first spring 306. In this position, the mask advancing mechanism 82 may be manipulated to move the mask. As described below, the claw 324 is engaged with the indentation 315 before a picture is taken with the camera and after the film has been advanced with the advance lever 38.

The interlock wheel 310 is preferably integrally formed or coupled to the mask advancing mechanism 82, so that the interlock wheel 310 rotates with the mask advancing mechanism 82. Since they are integrally formed, the mask advancing mechanism 82 cannot be rotated if the interlock wheel 310 is prevented from being rotated. As shown, the periphery of the interlock wheel 310 may have a plurality of teeth 330 for engaging with the second end 320 of the second interlock lever 304.

Prior to taking a picture with the camera 10, the first interlock lever 302 and the second interlock lever 304 are each disposed in a first position, as shown in FIG. 13B. In this first position, the claw 324 of the second interlock lever 304 is engaged with the indentation 315 of the first interlock lever 302. When engaged in this first position, both the first interlock lever 302 and the second interlock lever 304 are held against the biasing provided by the first spring 306 and the second spring 308. As shown, in this first position the second end 320 of the second interlock lever 304 is disengaged from the interlock wheel 310. Therefore, the camera user is free to manipulate the mask advancing mechanism 82 to scroll through the mask objects and select a mask object.

After a mask object has been selected, the camera user depresses the picture taking mechanism 28 to expose the film in the first film exposing chamber 48 and create an object image on the film, as described above. In addition to creating an object image on the film, the operation of the picture taking mechanism 28 engages the interlock 300, as follows, to enable the interlock. This interlock 300 prevents the camera user from changing the selected mask object, prior to exposing the film to the selected mask object, and thereby ensures the creation of a composite image that includes the object image previously created and the selected mask object.

When depressed, the shaft 28a of the picture taking mechanism 28 moves down, with respect to FIG. 13B. As the shaft 28a moves, the ramped surface 28b of the shaft 28a contacts the first interlock lever 302 and pushes the first interlock lever in the clockwise direction against the biasing of the first spring 306. As the first interlock lever 302 rotates clockwise, the claw 324 of the second interlock lever 304 is released from the indentation 315. Once released, the second interlock lever 304 rotates in the counter clockwise direction, due to the bias exerted by the second spring 308, from its first position to its second position, as shown in FIG. 13A. In this second position, the second end 320 of the second interlock lever 304 engages the teeth 330 of the interlock wheel 310.

As the picture taking mechanism 28 is released, the first interlock lever 302 rotates counter clockwise, due to the biasing of the first spring 306, to its second position. In this second position, the claw 324 of the first interlock lever 302 contacts the second interlock lever 304, as best shown in FIG. 13A. The claw 324, however, is not inserted into the indentation 315 because the claw 324 is not aligned with the indentation 315.

While the second end 320 is engaged with the teeth 330 of the interlock wheel 310, the second interlock lever 304 prevents the mask advancing mechanism 82 form rotating. If a camera user attempts to rotate the mask advancing mechanism 82, it will not because the attached or integrally formed interlock wheel 310 is prevented from rotating by the spring biased second interlock lever 304. Because the mask advancing mechanism 82 cannot rotate, an interlock is created that prevents changing the selected mask image after an object image has been created, but before the mask image has been placed on the film to create the desired composite image.

Once a picture is taken to create an object image, the advance lever 38 may be rotated, as shown in phantom in FIG. 13B, to move the film and expose the film to the selected mask object and create a composite image, as described above. As the advance lever 38 rotates, the finger 312 engages the first end 322 of the second interlock lever 304 and causes the second interlock lever 304 to rotate in the clockwise direction against the biasing of the second spring 308. As the second interlock lever 304 rotates, the second interlock lever 304 disengages from the interlock wheel 3 10 and contacts the first interlock lever 302 to rotate the first interlock lever 302 against the biasing of the first spring 306. As the first interlock lever 302 and the second interlock lever 304 rotate, the claw 324 is inserted into the indentation 315. Once the claw 324 is inserted into the indentation 315, the first interlock lever 302 and the second interlock lever 304 become latched. In this position, the second interlock lever 304 is held against the bias of the second spring 308 and out of engagement with the interlock wheel 310. With the composite image created by movement of the film by the advance lever 38, the interlock 300 is disabled and the mask advancing mechanism 82 can be operated to select a mask object.

In summary, the interlock 300 prevents the camera user from changing the selected mask object after a picture is taken and until a composite image is created by exposure to the selected mask object. In the embodiment shown, the interlock 300 is enabled by the manipulation of the picture taking mechanism 28 and is disabled by the exposure of the film to the selected mask object, which occurs when the film is advanced.

SECOND PREFERRED EMBODIMENT

A second embodiment of the camera 10 of this invention is shown in FIGS. 14–18. This camera 10 also includes a mask cartridge 22 that can be used to create a composite image 11 on a frame 12 of film 14. The back cover 32 of this embodiment of the camera 10 of the this invention is illustrated in FIG. 3. Similar to the mask cartridge 22 described above, the mask cartridge 22 may have a mask 20, a mask advancing mechanism 82, a viewfinder mask 118, a first mask spool 74 and a second mask spool 76. These features are similar to those described above, with the exception of the mask 20 and the viewfinder mask 118.

In this embodiment, the mask 20 contains a plurality of sections 124 that are each divided into a first region 126 and a second region 128, as shown in FIGS. 14 and 19. The first region 126 of each of these sections is transparent, so that light can travel through the first region 126. The first region 126 does not have a mask object 24 and is preferably transparent. The second region 128 of each of these sections has at least one mask object 24. Preferably, each section of the mask 20 has a different mask object 24 on its second region 128. In the embodiment shown in FIGS. 14–18, the first region 126 of each section of the mask 20 is disposed above the second region 126 of each section 124 of the mask 20.

Other embodiments of the mask 20 (not shown) can be created in which the first 126 and the second 128 region of each section of the mask 20 are disposed in different positions relative to each other rather than above and below. For example, they could be side by side. Alternatively, the first region 126 could surround the second region 128 or the second region 128 could surround the first region 126. These examples are provided by way of illustration and not by way of limitation. As described below, the positions of the first and the second region relative to each other depend on the shape of the shield 130 of the mask cartridge 22.

As with the first embodiment, the type of objects 24 that may be contained on the mask 20 are infinite. For example, the objects could be characters, word descriptions, numerical indications, inanimate objects, banners, and the like. Even more specifically, an image could have a birthday cake, presents, and the title "Happy Birthday."

Figure 15:
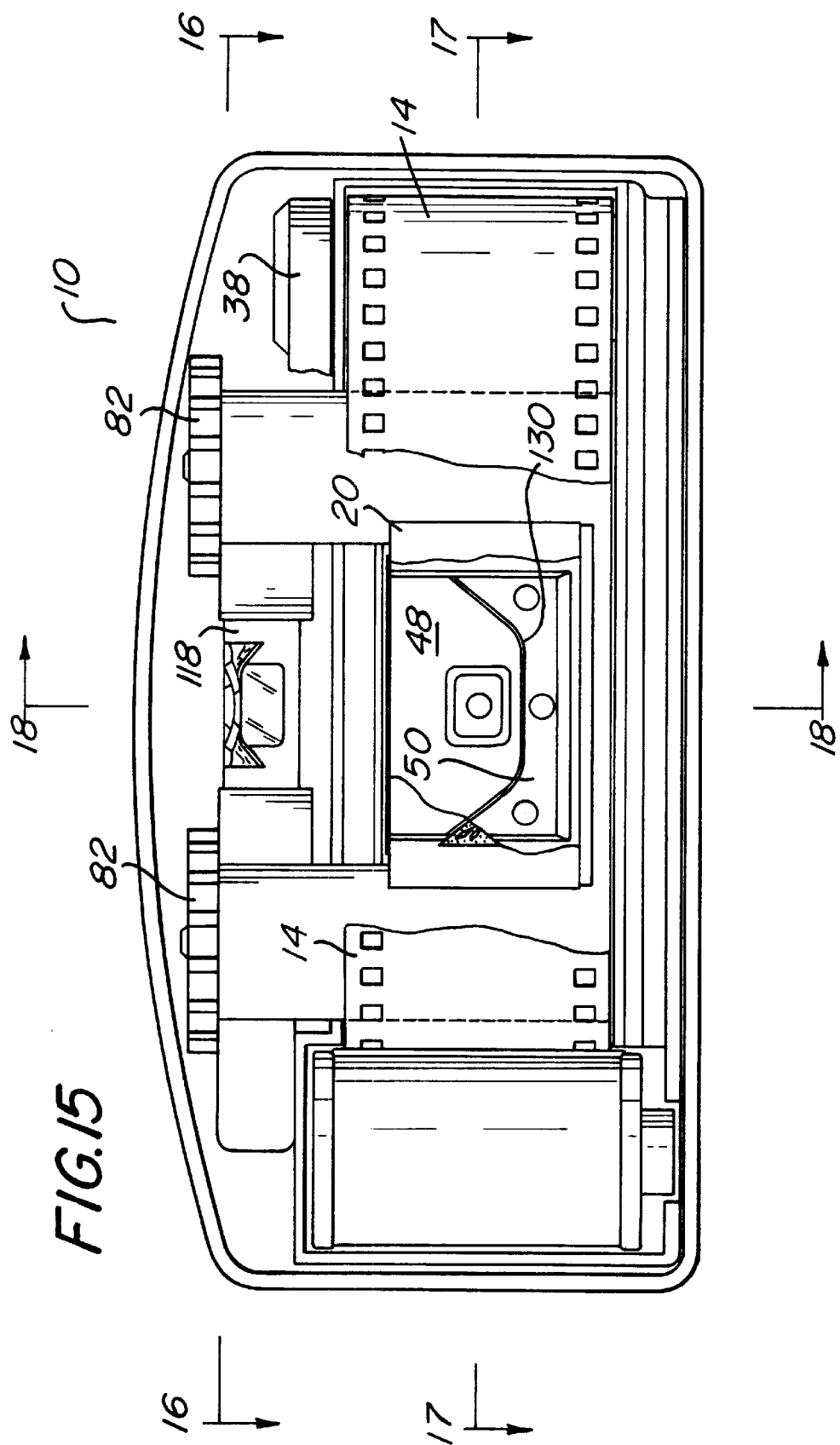
FIG. 15 is a cross sectional view of the preferred embodiment of FIG. 14.
Figure 18:
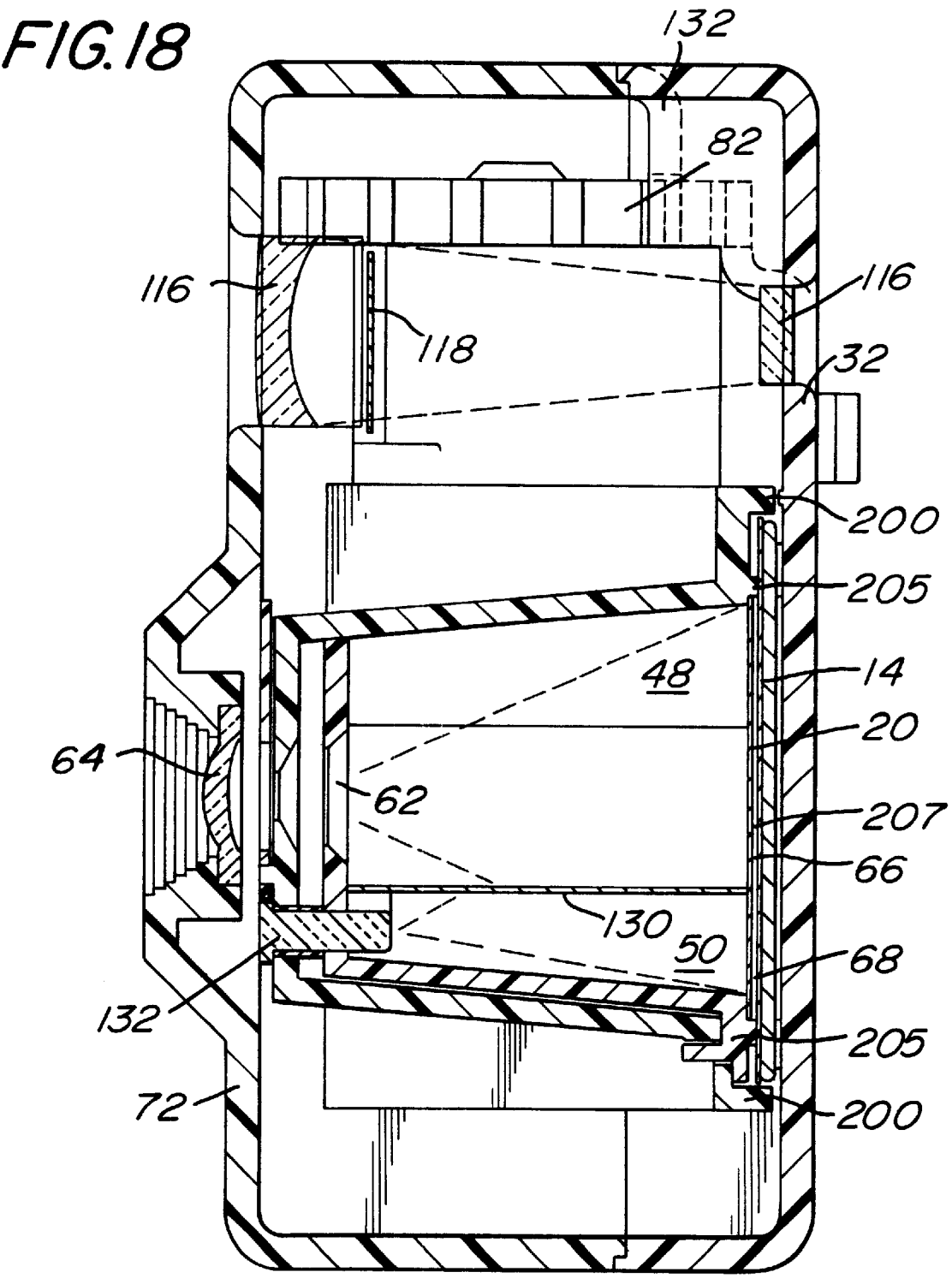
FIG. 18 is a cross section taken through line 18—18 of FIG. 15.

This embodiment of the camera is similar to that described above and may further include a first 48 and a second 50 film exposing chamber, as is best shown in FIGS. 15 and 18. However, in contrast to the first embodiment described above in which the first 48 and the second 50 film exposing chambers are disposed side by side, the first film exposing chamber 48 is disposed above the second film exposing chamber 50. Each of the first 48 and the second 50 film exposing chambers may each have a first side 52, a second side 54 and a third side 56. The lens 64 of the camera 10 may be aligned with the window 62 disposed in the third side 56 of the first film exposing chamber 48. The back 32 of the camera 10 may define a fourth side of each of the film exposing chambers 48, 50, as is best seen in FIGS. 16 and 17.

When the back cover 32 of the camera 10 is disposed over the first and the second film exposing chambers 48, 50, a first opening 66 and a second opening 68, as shown in FIG. 18, are created between the first 52 and the second 54 sides of the first 48 and the second 50 film exposing chambers. The film 12 may travel from the film cassette 40 through the first and the second openings 66, 68 and into the film exposing chambers 48, 50, as best seen in FIGS. 15 and 17. From the film exposing chambers 48, 50, the film 14 can travel to the film spool 36. In addition, the mask 20 of the mask cartridge 22 may move from the mask spools 74, 76 and through the first 66 and the second 68 openings and into the first 48 and the second 50 film exposing chambers, as best shown in FIG. 17.

In this second embodiment, the mask cartridge 22 has a shield 130 that divides the first 48 and the second 50 film exposing chambers when the mask cartridge is inserted into the camera 10. The shield defines the bottom of the first film exposing chamber 48 and the top of the second film exposing chamber 50, as shown in FIG. 18. In this second embodiment, the camera 10 has a first 84 and a second 86 mask spool receiving area that are similar to those described above with reference to the first embodiment of the camera 10.

When film is loaded into the camera 10, a first portion 42 of a frame 12 of film 14 is disposed above the mask shield 130 in the first film exposing chamber 48, and a second portion 44 of the frame 12 of film 14 is disposed below the mask shield 130 in the second film exposing chamber 50. The mask 20 is disposed between the frame 12 of film 14 and the camera lens 64. The transparent first region 126 of a section 124 of the mask 20 is disposed above the shield 130, so that light entering the first film exposing chamber 48 from the camera lens 64 reaches the first portion 42 of the frame 12 of film 14 and thereby exposes the first portion 42 of the frame 12 of film 14. This creates an object image 16 of an object external to the camera 10 on the first portion 42 of the frame 12 of film 14.

The second portion 50 of the frame 12 of film 14 is disposed below the shield 130 in the second film exposing chamber 50, so that it is not exposed to light from the object whose picture is being taken. In the second film exposing chamber 50, the second region 128 of the mask 20, that has a mask object 24, is disposed proximal to the second portion 44 of the frame 12 of film 14. Connected to the second film exposing chamber 50 is a light pipe 132, as is best shown in FIGS. 17 and 18. This light pipe 132 is connected to the camera flash 26. Light pipes 132 are well known in the art and can be used to transmit light from a camera flash as described in U.S. Pat. No. 5,486,885, which is hereby incorporated by reference. In this embodiment of the camera 10, when the flash 26 is triggered by the camera user, light from the flash 26 is transmitted through the light pipe 132 to the second film exposing chamber 50. When light enters the second film exposing chamber 50, it exposes the second portion 44 of the frame 12 of film 14 and creates an image of the mask object 24 on the second portion 44 of the frame 14 of film 12.

Thus, in this embodiment, when the flash 26 is triggered a composite image 11 is created on a frame 12 of film 14. An object image 16 of an object external to the camera 10 is created on the first portion 42 of the frame 12 of film 14, and a mask image 18 is created on the second portion 44 of the frame 12 of film 14. The operation of this embodiment is best understood with reference to FIGS. 19 and 20. FIG. 19 shows schematically the film 14 and the mask 20 loaded into the camera 10, and the camera focused on an object that is external to the camera 10. As illustrated, the object is a person. The mask image 18 on the second region 128 of the mask 20 is a present and a tree. When the flash 26 is triggered to take a picture, two things occur. First, the first portion 42 of the frame 12 of film 14 is exposed to light through the transparent first region 126 of a section 124 of the mask 20 from the object to create an object image 16 on the first portion 42 of the frame 12 of film 14. Secondly, light is transmitted from the flash 26 through the light pipe 132 to the second film exposing chamber 50 and the second portion 44 of the frame 12 of film 14 is exposed. When exposed, a mask image 18 is created on the second portion 44 of the frame 12 of film 14. This creates the composite image 11, as shown in FIG. 19. After a composite image 11 is formed, the film can be advanced so that the next frame 12 of film 14 is disposed in the film exposing chambers 48, 50, as shown in FIG. 20.

The second embodiment differs from the first embodiment in that in the second embodiment, the first 42 and the second portion 44 of the frame 12 of film 14 are exposed together without moving the film 12. In contrast, in the first embodiment, the first and the second portions 42, 44 of a frame 12 are exposed separately. Thus, the first embodiment has an advantage in that an object image 16 can be created on a first portion 42 of a frame 12 of film 14 and a camera user can then select a mask image to place on the second portion 44 of the frame 12 of film 14. Alternatively stated, the first embodiment does not require pre-selecting a mask image prior to taking a picture. This provides the camera user with additional time to select an image after a picture is taken. However, the second embodiment of FIGS. 14–18 has the advantage in that it may be more compact.

As alluded to above, each section 124 of the mask 20 may be divided into a plurality of sections 124 they each have a first region 126 and a second region 128. In the embodiment shown, the first region 126 is disposed above the second region 128. The first region is disposed above the mask shield 130 and the second region 128 is disposed below the mask shield 130. If the mask shield 130 took on a different shape, the first region 126 and the second region 128 could be shaped appropriately so that the first region 126 and the first film exposing chamber 48 are defined by the shape of the shield 130 and the second region 128 would be disposed in the second film exposing chamber 50 and defined by the shape of the mask shield 130.

Instead of a light pipe 132, a light bulb that is coupled to the mechanism that activates the flash may be used to expose the film to the mask object. Alternatively, another source of light can be illuminated to expose the film to the mask object after the picture of the object external to the camera has been taken with the camera 10.

Similar to the first embodiment described above, this second embodiment may also have a mechanism for separating the film 14 and the mask 22. In this second embodiment, the mask 22 rides underneath the mask rails 205 that extends from the top of the first film exposing chamber and the film 14 rides between the film rails 200. This creates a gap 207 of separation between the film 14 and the mask 22 to prevent them form contacting each other and damaging each other or causing operational problems with the camera 10. This gap 207 of separation is best illustrated in FIGS. 17 and 18.

The camera 10 of this invention may be a so called "single-use" camera. Single-use cameras are those that are sold with film preloaded into them and are intended to be returned with the entire camera to a film developer. In these types of cameras, a disposal packaging is typically employed around the camera that must be removed in order to remove the film cassette and develop the film. Of course, this invention may also be employed with conventionally known "reusable " cameras as well.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A camera for creating a composite film image that has a first portion and a second portion by generating an object image of an object whose picture is taken with the camera on the first portion and a mask image on the second portion, comprising:
   a main body and a back cover;
   a mask cartridge, disposed between the main body and the back cover, the mask cartridge comprising a mask that has a mask object and a mask advancing mechanism for advancing the mask;
   a first chamber, disposed in the main body, for exposing the first portion to the object external to the camera whose picture is being taken with the camera to create the object image on the first portion; and
   a second chamber, disposed in the main body, for exposing the second portion to the mask object to create the mask image on the second portion of the film.

2. The camera of claim 1, wherein the mask cartridge further comprises a pair of spools and the mask is wound around the spools.

3. The camera of claim 1, further comprising a viewfinder and wherein the mask cartridge further comprises a viewfinder mask that is viewable in the viewfinder.

4. The camera of claim 3, wherein the viewfinder mask comprises an image that corresponds to the mask object on the mask.

5. The camera of claim 3, wherein the mask cartridge further comprises a pair of viewfinder spools for advancing the viewfinder mask.

6. The camera of claim 1, wherein the mask cartridge further comprises a pair of spools on which the mask is disposed and a viewfinder mask that is also disposed on the pair of spools and wherein the mask advancing mechanism is coupled to the pair of spools and can be manipulated to advance the mask and the viewfinder mask simultaneously.

7. The camera of claim 1, wherein a light source is disposed in the second chamber.

8. The camera of claim 7, further comprising a film advancing mechanism for advancing the film and activating the light source when the frame of film is advanced to the second chamber.

9. The camera of claim 8, further comprising a capacitor that is in electrical communication with the light source and that is activated by the film advancing mechanism to activate the light source.

10. The camera of claim 1, further comprising a flash and a light pipe, the light pipe being disposed between the flash and the second chamber, for transmitting light from the flash to the second chamber when the flash is operated and thereby exposing the second portion and creating the mask image of the mask object on the second portion.

11. The camera of claim 1, wherein the mask comprises
   (I) a first section, disposed between the back cover and the first chamber, the first section having a first region for exposing the first portion and a second region for masking the second portion, so that when a picture of the object external to the camera is taken, the object image is created on the first portion and the second portion of the frame of film is masked; and
   (ii) a second section of the mask being disposed between the back cover and the second chamber and having a first region for masking the first portion after the object image has been created by exposing the first portion of the film in the first chamber and a second region that has the mask object for generating the mask image on the second portion of the film, so that when the film is exposed in the second chamber the mask image of the mask object is placed on the second portion of the film.

12. The camera of claim 1, wherein the mask comprises a plurality of sections, each of the sections having a first portion that is transparent and a second portion that has the mask object.

13. The camera of claim 1, wherein the mask further comprises a plurality of mask images and the camera further comprises an interlock, coupled to the main body, that is operative to prevent moving the mask after the first portion has been exposed in the first chamber until the second portion is exposed in the second chamber.

14. The camera of claim 13, wherein the interlock, is coupled to a picture taking mechanism, the picture taking mechanism being operative to expose the first portion in the first chamber and to enable the interlock to prevent moving the mask after the first portion has been exposed in the first chamber.

15. The camera of claim 14, wherein the interlock comprises a film advance lever, that is operative to move the film from the first chamber to the second chamber, expose the film in the second chamber and to disable the interlock.

16. The camera of claim 15, wherein the mask cartridge further comprises a pair of mask spools around which the mask is wound and that are coupled to the mask advancing mechanism, so that manipulation of the mask advancing mechanism moves the mask and permits one of the plurality of mask images to be selected for exposure in the second film exposing chamber.

17. The camera of claim 16, wherein the interlock further comprises a lever, that is rotatably mounted within the camera, and a mask wheel that is coupled to the mask advancing mechanism, the lever being operative to engage the mask wheel to prevent operation of the mask advancing mechanism and movement of the mask in response to operation of the picture taking mechanism.

18. A camera for creating a composite film image that has a first portion and a second portion by generating an object image of an object whose picture is taken with the camera on the first portion and a mask image on the second portion, comprising:
   a main body and a back cover;
   a mask, disposed between the main body and the back cover, the mask comprising a plurality of mask objects;
   a mask advancing mechanism, coupled to the mask, and being operable to move the mask, so that one of the plurality of mask objects may be selected for exposing to the film;
   a first chamber, disposed in the main body, for exposing the first portion to the object external to the camera whose picture is being taken with the camera to create the object image on the first portion;
   a second chamber, disposed in the main body, and the mask being moveable through the second chamber so that the one of the plurality of mask objects selected with the mask advancing mechanism may be exposed to the second portion in the second chamber; and
   an interlock, coupled to the main body and engageable with the mask advancing mechanism to prevent movement of the mask by the mask advancing mechanism after the first portion has been exposed in the firs t chamber and until the second portion is exposed in the second chamber.

19. A camera for creating a composite image on a film that has a first portion and a second portion by generating an object image of an object whose picture is taken with the camera on the first portion and a mask image on the second portion of a mask object disposed on a mask, comprising:

a main body and a back cover;

a first chamber, disposed in the main body, for exposing the first portion to an object external to the camera whose picture is being taken with the camera to create the object image on the first portion;

a second chamber, disposed in the main body, for exposing the second portion to the mask object to create the mask image on the second portion of the film; and the mask comprising:
(I) a first section, disposed between the back cover and the first chamber, the first section having a first region for exposing the first portion and a second region for masking the second portion, so that when a picture of the object external to the camera is taken, the object image is created on the first portion and the second portion is masked; and
(ii) a second section of the mask being disposed between the back cover and the second chamber and having a first region for masking the first portion after the object image has been created by exposing the first portion in the first chamber, and a second region that has the mask object for generating the mask image on the second portion, so that when the film is exposed in the second chamber the mask image of the mask object is placed on the second portion.

20. The camera of claim 19, further comprising a mask cartridge in which the mask is disposed.

21. The camera of claim 20, wherein the mask cartridge further comprises a pair of spools on which the mask is disposed.

22. The camera of claim 20, wherein the mask cartridge further comprises a mask advancing mechanism for moving the mask within the camera.

23. The camera of claim 19, further comprising a viewfinder and a viewfinder mask that is viewable in the viewfinder window.

24. The camera of claim 19, wherein a light source is disposed in the second chamber.

25. The camera of claim 24, further comprising a film advancing mechanism for advancing the film and activating the light source when the frame of film is advanced to the second chamber.

26. The camera of claim 25, further comprising a capacitor that is in electrical communication with the light source and is activated by the film advancing mechanism to activate the light source.

27. A camera for creating a composite image on a film that has a first portion and a second portion by generating an object image of an object whose picture is taken with the camera on the first portion and a mask image on the second portion of a mask object disposed on a mask, comprising:

a main body and a back cover;

a first chamber, disposed in the main body, for exposing the first portion to the object external to the camera whose picture is being taken with the camera to create the object image on the first portion;

a second chamber, disposed in the main body, for exposing the second portion to the mask object to create the mask image on the second portion;

a mask cartridge;

a mask disposed within the mask cartridge comprising:
(i) a first section, disposed between the back cover and the first chamber, the first section having a first region for exposing the first portion and a second region for masking the second portion, so that when a picture of the object external to the camera is taken, the object image is created on the first portion and the second portion is masked;
(ii) a second section of the mask being disposed between the back cover and the second chamber and having a first region for masking the first portion after the object image has been created by exposing the first portion in the first chamber and a second region that has the mask object for generating the mask image on the second portion of the film, so that when the film is exposed in the second chamber the mask image of the mask object is placed on the second portion.

28. The camera of claim 27, wherein the mask cartridge further comprises a pair of spools on which the mask is disposed.

29. The camera of claim 27, wherein the mask cartridge further comprises a mask advancing mechanism for moving the mask within the camera.

30. The camera of claim 27, further comprising a viewfinder and a viewfinder mask, disposed in the mask cartridge, that is viewable in the viewfinder window.

31. The camera of claim 27, wherein a light source is disposed in the second chamber.

32. The camera of claim 31, further comprising a film advancing mechanism for advancing the film and activating the light source when the frame of film is advanced to the second chamber.

33. The camera of claim 32, further comprising a capacitor that is in electrical communication with the light source and is activated by the film advancing mechanism to activate the light source.

34. A camera for creating a composite image on a film that has a first portion and a second portion by generating an object image of an object whose picture is taken with the camera on the first portion of the film and a mask image on the second portion of the film of a mask object disposed on a mask, comprising:

a main body that has a film exposing chamber defined in the main body; and a mask cartridge that has a mask and a mask advancing mechanism for advancing the mask, the mask cartridge being disposed in the main body so that the mask extends across the film exposing chamber, the mask having the mask object for creating the mask image of the mask object on the frame of film.

35. The camera of claim 34, wherein the mask cartridge further comprises a pair of spools and the mask is wrapped around the spools.

36. The camera of claim 34, further comprising a viewfinder and wherein the mask cartridge further comprises a viewfinder mask that is viewable in the viewfinder.

37. The camera of claim 36, wherein the viewfinder mask comprises image that correspond to the mask object on the mask.

38. The camera of claim 37, wherein the mask cartridge further comprises a pair of viewfinder spools for advancing the viewfinder mask.

39. The camera of claim 34, wherein the mask cartridge further comprises a pair of spools on which the mask is disposed, a viewfinder mask that is also disposed on the pair of spools and wherein the mask advancing mechanism can be manipulated to move the mask and the viewfinder mask simultaneously.

40. The camera of claim 34, further comprising a second chamber for exposing the film to the mask object disposed on the mask.

41. The camera of claim 40, further comprising a light source disposed in the second chamber.

42. The camera of claim 41, further comprising a film advancing mechanism for advancing the film and activating the light source when the film is advanced to the second chamber.

43. The camera of claim 42, further comprising a capacitor that is in electrical communication with the light source and is activated by the film advancing mechanism to activate the light source.

44. The camera of claim 40, further comprising a flash and a light pipe, disposed between the flash and the second chamber, for transmitting light from the flash to the second chamber when the flash is operated and thereby exposing the second portion of the film and creating the mask image of the mask object on the second portion of the film.

45. A camera for creating a composite image on a film that has a first portion and a second portion by generating an object image of an object whose picture is taken with the camera on the first portion and a mask image of a mask object disposed on a mask on the second portion, comprising:
   a main body and a back cover;
   a first chamber, disposed in the main body, for exposing the first portion to the object external to the camera whose picture is being taken by the camera to create the object image on the first portion;
   a second chamber, disposed in the main body, for exposing the second portion to the mask object to create the mask image on the second portion;
   a flash;
   a light pipe, disposed between the flash and the second chamber, for transmitting light from the flash to the second chamber; and
   a mask cartridge, disposed within the main body and the back cover, the mask cartridge comprising a mask that has a plurality of selectable mask objects from which the mask object, whose image is to be created on the second portion, can be selected.

46. A mask cartridge that can be inserted into and removed from a camera to create a composite image on a film, comprising:
   a first and a second mask spool;
   a mask extending from the first mask spool to the second mask spool, the mask having a plurality of mask objects for creating images on the film; and
   a mask advancing mechanism coupled to the first and the second mask spools for moving the mask between the first and the second spools.

47. The mask cartridge of claim 46, further comprising a viewfinder mask that has images of the mask objects on the mask.

48. The mask cartridge of claim 46, wherein the mask comprises a plurality of sections, each section having a first region that is transparent and a second region that has one of the mask objects.

49. The mask cartridge of claim 48, wherein the mask comprises a plurality of first sections that are adjacent to a plurality of second sections, each of the first sections having a first region that is transparent and a second region for masking a first portion of the film and each of the second sections having a first region for masking a second portion of the film and a second region that has the mask object for creating the mask image on the first portion of the frame of film.

50. A camera for creating a composite image on a film that has a first portion and a second portion by generating an object image of an object whose picture is taken with the camera on the first portion of the film and a mask image on the second portion of the film of a mask object disposed on a mask, comprising:
   a film exposing chamber;
   a view finder; and
   a mask cartridge comprising a mask which has a plurality of mask objects and view finder mask which has a plurality of view finder mask objects that correspond to the mask objects, such that the camera user can view one of the plurality of view finder mask objects in the view finder while the corresponding mask object is disposed in the film exposing chamber.

51. The camera of claim 50, wherein the mask cartridge further comprises a mask advancing mechanism that can be manipulated to simultaneously move the mask and the view finder mask so that when one of the view finder mask images is disposed within the view finder and a corresponding mask image is disposed within the film exposing chamber.

52. The camera of claim 51, wherein the mask cartridge further comprises a pair of mask spools around which the mask and the view finder mask are wound and which are coupled to the mask advancing mechanism.

53. A camera for creating a composite film image that has a first portion and a second portion by generating an object image of an object whose picture is taken with the camera on the first portion and a mask image on the second portion, comprising:
   a main body and a back cover;
   a mask cartridge, disposed between the main body and the back cover, the mask cartridge comprising a mask that has a mask object;
   a first chamber, disposed in the main body, for exposing the first portion to the object external to the camera whose picture is being taken with the camera to create the object image on the first portion;
   a second chamber, disposed in the main body, for exposing the second portion to the mask object to create the mask image on the second portion of the film;
   a picture taking mechanism, disposed on the camera, that when manipulated exposes the first portion of the film disposed in the first chamber to create the object image on the first portion; and
   a film advancing mechanism, disposed on the camera, and coupled to a light source which is in communication with the second chamber, such that when the film advancing mechanism is manipulated the light source is activated and the second portion of the film disposed in the second chamber is exposed to the mask object.

54. A mask cartridge, comprising:
   a housing;
   a first and a second mask spool disposed within the housing;
   a mask comprising a plurality of mask objects for creating a mask image on a frame of film;
   the mask being wound around the first and the second mask spools; and
   a mask advancing mechanism coupled to the first and second mask spools for moving the mask between the first and the second mask spools.

55. The mask cartridge of claim 54, wherein the mask comprises a plurality of sections, each section having a first region that is transparent and a second region that has one of the mask objects.

56. The mask cartridge of claim 54, wherein the mask comprises a plurality of first sections that are adjacent to a plurality of second sections, each of the first sections having a first region that is transparent and a second region for masking a first portion of the film and each of the second sections having a first region for masking a second portion of the film and a second region that has the mask object for creating the mask image on the first portion of the frame of film.

57. The mask cartridge of claim 54, wherein the housing comprises a first and a second film exposing chamber.

58. The mask cartridge of claim 54, wherein the housing comprises a mask shield which is disposed between the first and the second mask spools.

59. The mask cartridge of claim 54, further comprising a viewfinder mask that has images of the mask objects on the mask.

60. The mask cartridge of claim 59, wherein the viewfinder mask is wound around a first and a second view finder mask spool which are both disposed within the housing.

61. The mask cartridge of claim 60, wherein the first mask spool and the first viewfinder mask spool are disposed on a common shaft.

* * * * *